United States Patent
Seregin et al.

(10) Patent No.: US 11,146,795 B2
(45) Date of Patent: Oct. 12, 2021

(54) INTRA FILTERING FLAG IN VIDEO CODING

(71) Applicant: QUALCOMM Incorporated, San Diego, CA (US)

(72) Inventors: Vadim Seregin, San Diego, CA (US); Marta Karczewicz, San Diego, CA (US); Xin Zhao, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/914,514

(22) Filed: Mar. 7, 2018

(65) Prior Publication Data

US 2018/0262763 A1    Sep. 13, 2018

Related U.S. Application Data

(60) Provisional application No. 62/470,099, filed on Mar. 10, 2017, provisional application No. 62/475,739, filed on Mar. 23, 2017.

(51) Int. Cl.
*H04N 19/159* (2014.01)
*H04N 19/61* (2014.01)
(Continued)

(52) U.S. Cl.
CPC .......... *H04N 19/159* (2014.11); *H04N 19/11* (2014.11); *H04N 19/117* (2014.11);
(Continued)

(58) Field of Classification Search
CPC ...... H04N 19/176; H04N 19/70; H04N 19/61; H04N 19/46; H04N 19/159; H04N 19/44;
(Continued)

(56) References Cited

U.S. PATENT DOCUMENTS

| 6,088,802 A | 7/2000 | Bialick et al. |
| 8,356,189 B2 | 1/2013 | Carrico et al. |

(Continued)

FOREIGN PATENT DOCUMENTS

| EP | 2506574 A2 | 10/2012 |
| EP | 2699000 A1 | 2/2014 |

OTHER PUBLICATIONS

Filippov A., et al., "Adaptive reference sample smoothing simplification," 2. JVET Meeting; Feb. 20, 2016-Feb. 26, 2016; San Diego, CA (The Joint Video Exploration Team of ISO/IEC JTC1/SC29/WG11 and ITU-T SG.16); URL: http:/phenix.int-evry.fr/jvet/, No. JVET-B0041-v4, Feb. 21, 2016 (Feb. 21, 2016), pp. 1-6, XP030150036.

(Continued)

*Primary Examiner* — Farhan Mahmud
(74) *Attorney, Agent, or Firm* — Shumaker & Sieffert, P.A.

(57) ABSTRACT

A method of decoding video data including, receiving a first block of video data, receiving a first syntax element indicating if a coding mode is to be used for the first block of video data in the case that the first block of video data is associated with a number of non-zero transform coefficients greater than or equal to a threshold, explicitly decoding a value of the received first syntax element, and applying the coding mode to the first block of video data in accordance with a value of the first syntax element.

36 Claims, 7 Drawing Sheets

(51) Int. Cl.

| | |
|---|---|
| *H04N 19/82* | (2014.01) |
| *H04N 19/126* | (2014.01) |
| *H04N 19/70* | (2014.01) |
| *H04N 19/14* | (2014.01) |
| *H04N 19/18* | (2014.01) |
| *H04N 19/176* | (2014.01) |
| *H04N 19/11* | (2014.01) |
| *H04N 19/117* | (2014.01) |
| *H04N 19/13* | (2014.01) |
| *H04N 19/147* | (2014.01) |
| *H04N 19/157* | (2014.01) |

(52) U.S. Cl.
CPC ........... *H04N 19/126* (2014.11); *H04N 19/14* (2014.11); *H04N 19/176* (2014.11); *H04N 19/18* (2014.11); *H04N 19/619* (2014.11); *H04N 19/70* (2014.11); *H04N 19/82* (2014.11); *H04N 19/13* (2014.11); *H04N 19/147* (2014.11); *H04N 19/157* (2014.11)

(58) Field of Classification Search
CPC .... H04N 19/117; H04N 19/91; H04N 19/105; H04N 19/463
See application file for complete search history.

(56) References Cited

U.S. PATENT DOCUMENTS

| 8,621,601 | B2 | 12/2013 | Yan et al. | |
|---|---|---|---|---|
| 2009/0257492 | A1 | 10/2009 | Andersson et al. | |
| 2013/0034158 | A1* | 2/2013 | Kirchhoffer | H04N 19/159 375/240.12 |
| 2014/0355669 | A1* | 12/2014 | Chien | H03M 7/4018 375/240.02 |
| 2016/0063462 | A1 | 3/2016 | Whytock | |
| 2016/0359836 | A1 | 12/2016 | Horgan et al. | |
| 2017/0094285 | A1 | 3/2017 | Said et al. | |
| 2018/0131962 | A1 | 5/2018 | Chen et al. | |
| 2018/0199062 | A1 | 7/2018 | Zhang et al. | |
| 2018/0367814 | A1 | 12/2018 | Seregin et al. | |
| 2019/0149822 | A1 | 5/2019 | Kim et al. | |
| 2020/0021818 | A1 | 1/2020 | Seregin et al. | |

OTHER PUBLICATIONS

Huawei Technology Ltd. Co., "Reference sample adaptive filtering for intra coding," ITU, Telecommunication Standardization Sector, COM 16—C 983—E, Oct. 2015, 4 Pages.
International Search Report and Written Opinion—PCT/US2018/021495—ISA/EPO—dated Apr. 26, 2018, 16 pp.
Kim S-H., et al., "Further improvement of intra coding tools," Joint Video Exploration Team (JVET) of ITU-T SG 16 WP 3 and ISO/IEC JTC 1/SC 29/WG 11, 2nd Meeting; San Diego, USA, Feb. 20-26, 2016, document No. JVET-30051, San Diego, USA, Feb. 20 2016, pp. 1-5.
Response to Written Opinion from International Application No. PCT/US2018/021495, dated Apr. 26, 2018, 23 pp.
Second Written Opinion from International Application No. PCT/US2018/021495, dated Jan. 21, 2019, 6 pp.
Karczewicz, et al., "Non-EE1: Alternative setting for PDPC mode," Joint Video Exploration Team (JVET) of ITU-T SG 16 WP 3 and ISO/IEC JTC 1/SC 29/WG 11; 6th Meeting; document No. JVET-F0054r2, Mar. 31-Apr. 7, 2017, 2 pp.
Seregin et al., "Non-EE1: Explicit flag signalling for ARSS," Joint Video Exploration Team (JVET) of ITU-T SG 16 WP and ISO/IEC JTC 1/SC 29/WG 11; 6th Meeting; document No. JVET-F0055r2, Mar. 31-Apr. 7, 2017, 2 pp.
Karczewicz et al., "EE1: Alternative setting for PDPC mode and explicit ARSS flag (tests 3-7)," Joint Video Exploration Team (JVET) of ITU-T SG 16 WP 3 and ISO/IEC JTC 1/SC 29/WG 11; 7th Meeting; document No. JVET-G0104, Jul. 13-21, 2017, 6 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
An J., et al., "Block partitioning structure for next generation video coding," MPEG doc. m37524 and ITU-T SG16 Doc.COM16-C966-E, Oct. 2015, pp. 1-7.
Alshina E., et al., "Description of Exploration Experiments on Coding Tools," Joint Video Exploration Team (JVET) of ITU-T SG 16 WP 3 and ISO/IEC JTC 1/SC 29/WG 11; 6th Meeting: Hobard, AU, Mar. 31-Apr. 7, 2017, JVET-F1011, Apr. 29, 2017, 10 pages.
Bjontegaard G., "Prop.(Pext) Extension for 4:2:2 and 4:4:4 YUV coding", 8. JVET Meeting; May 23, 2003-May 27, 2003; Geneva, CH; (Joint Video Team of ISO/IEC JTC1/SC29/WG11 and ITU-T SG.16), No. JVT-H032-L, May 27, 2003 (May 27, 2003), pp. 1-7, XP030005736.
Chen J., et al., "Algorithm Description of Joint Exploration Test Model 4," Joint Video Exploration Team (JVET) of ITU T SG 16 WP 3 and ISO/IEC JTC 1/SC 29/WG 11, 4th Meeting: Chengdu, Oct. 15-21, 2016, JVET-D1001-v3, 39 pp.
Chen J., et al., "Algorithm Description of Joint Exploration Test Model 5 (JEM 5)," Joint Video Exploration Team (JVET) of ITU-T SG 16 WP 3 and ISO/IEC JTC 1/SC 29/WG 11, 5th Meeting: Geneva, CH, Jan. 12-20, 2017, JVET-E1001-v2, 44 Pages.
Huang H., "EE2.1: Quadtree plus binary tree structure integration with JEM tools," Joint Video Exploration Team (JVET) of ITU-T SG 16 WP 3 and ISO/IEC JTC 1/SC 29/WG 11, 3rd Meeting: Geneva, CH, May 26-Jun. 1, 2016, JVET-C0024, 5 pp.
Leannec, F.L., et al., "Asymmetric Coding Units in QTBT," Joint Video Exploration Team (JVET) of ITU-T SG 16 WP 3 and ISO/IEC JTC 1/SC 29/WG 11; 4th Meeting, Chengdu, CN; Oct. 15-21, 2016, No. JVET-D0064, Oct. 10, 2016, 10 pp.
Lin Y., et al., "Modification to DC Prediction in SDIP", 97. MPEG Meeting; Jul. 18, 2011-Jul. 22, 2011; Torino, IT; (Motion Picture Expert Group or ISO/IEC JTC1/SC29/WG11), No. m21018, JCTVC-F584, Jul. 2, 2011 (Jul. 2, 2011), pp. 1-3, XP030049581.
Panusopone K., et al., "Cross-Check of JVET-F0055 : Explicit Flag Signalling for ARSS", 6th JVET Meeting; Mar. 31, 2017-Apr. 7, 2017; Hobart, AU; (The Joint Video Exploration Team of ISO/IEC JTC1/SC29/WG11 and ITU-T SG.16); URL: http://phenix.int-evry.fr/jvet/, No. JVET-F0081, Apr. 2, 2017, XP030150755, 2 pages.
Panusopone K., et al., "Unequal Weight Planar Prediction and Constrained PDPC", 5th JVET Meeting; Jan. 12, 2017-Jan. 20, 2017; Geneva, CH; (The Joint Video Exploration Team of ISO/IEC JTC1/SC29/WG11 and ITU-T SG.16); URL: http://phenix.int-evry.fr/jvet/, No. JVET-E0068, Jan. 5, 2017, XP030150550, 6 pages.
Seregin V., et al., "Non-EE1: PDPC without a Mode Flag", 7th JVET Meeting; Jul. 13, 2017-Jul. 21, 2017; Torino, IT; (The Joint Video Exploration Team of ISO/IEC JTC1/SC29/WG11 and ITU-T SG.16); URL: http://phenix.int-evry.fr/jvet/, No. JVET-G0107-v2, Jul. 8, 2017, XP030150909, 3 pages.
Wang Y-K., et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.
International Preliminary Report on Patentability—PCT/US2018/021495, The International Bureau of WIPO—Geneva, Switzerland, May 22, 2019, 21 pp.
Chen J., et al., "Algorithm Description of Joint Exploration Test Model 1," Joint Video Exploration Team (JVET) of ITU-SG 16 WP 3 and ISO/IEC JTC 1/SC 29/WG 11, 1nd Meeting: Geneva, CH, Oct. 19-21, 2015, 27 Pages, JVET-A1001.
Filippov A., et al., "Reference Sample Adaptive Filtering for Intra Coding", 113. MPEG Meeting; Oct. 19, 2015-Oct. 23, 2015; Geneva; (Motion Picture Expert Group or ISO/IEC JTC1/SC29/WG11), No. m37526, Oct. 29, 2015 (Oct. 29, 2015), XP030065893.

\* cited by examiner

INTRA FILTERING FLAG IN VIDEO CODING

This application claims the benefit of U.S. Provisional Application No. 62/470,099, filed Mar. 10, 2017, and U.S. Provisional Application No. 62/475,739, filed Mar. 23, 2017, the entire content of both of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC or H.265) standard, and extensions of such standards. The video devices may transmit, receive, encode, decode, and/or store digital video information more efficiently by implementing such video coding techniques.

Video coding techniques include spatial (intra picture) prediction and/or temporal (inter picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Pictures may be referred to as frames, and reference pictures may be referred to as reference frames.

Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized. Entropy coding may be applied to achieve even more compression.

SUMMARY

This disclosure is related to intra prediction, determination of prediction directions, determination of prediction modes, determination of coding modes, determinations for the use of intra filtering in video coding (e.g., video encoding and/or video decoding), and explicitly coding and signaling syntax elements.

In one or more examples discussed below, a video encoder and a video decoder may be configured to determine whether or not to explicitly encode syntax elements indicating the use a coding mode based on a comparison of a number of non-zero transform coefficients associated with a block compared to a threshold. If the number of non-zero transform coefficients in the block is greater than or equal to a threshold, the video encoder and video decoder explicitly code the syntax element for the coding mode. If the number of non-zero transform coefficient in the block is less than the threshold, the video encoder and the video decoder do not explicitly code the syntax element indicating the coding mode. The techniques of this disclosure may be used with any coding modes, including intra reference sample smoothing filters, and position depending prediction combination (PDPC) modes.

In one example of the disclosure, a method of decoding video data comprises receiving a first block of video data, receiving a first syntax element indicating if a coding mode is to be used for the first block of video data in the case that the first block of video data is associated with a number of non-zero transform coefficients greater than or equal to a threshold, explicitly decoding a value of the received first syntax element, and applying the coding mode to the first block of video data in accordance with the value of the first syntax element.

In another example of the disclosure, a method of encoding video data comprises determining a coding mode for encoding a first block of video data, explicitly encoding a first syntax element indicating if the coding mode is to be used for the first block of video data in the case that the first block of video data is associated with a number of non-zero transform coefficients greater than or equal to a threshold, and signaling the first syntax element in an encoded video bitstream.

In another example of the disclosure, an apparatus configured to decode video comprises a memory configured to store the video data, and one or more processors in communication with the memory, the one or more processors configured to receive a first block of the video data, receive a first syntax element indicating if a coding mode is to be used for the first block of the video data in the case that the first block of the video data is associated with a number of non-zero transform coefficients greater than or equal to a threshold, explicitly decode a value of the received first syntax element, and apply the coding mode to the first block of the video data in accordance with the value of the first syntax element.

In another example of the disclosure, an apparatus configured to encode video data comprises a memory configured to store the video data, and one or more processors in communication with the memory, the one or more processors configured to determine a coding mode for encoding a first block of the video data, explicitly encode a first syntax element indicating if the coding mode is to be used for the first block of the video data in the case that the first block of the video data is associated with a number of non-zero transform coefficients greater than or equal to a threshold, and signal the first syntax element in an encoded video bitstream.

In another example of the disclosure, an apparatus configured to decode video data comprises means for receiving a first block of video data, means for receiving a first syntax element indicating if a coding mode is to be used for the first block of video data in the case that the first block of video data is associated with a number of non-zero transform coefficients greater than or equal to a threshold, means for explicitly decoding a value of the received first syntax element, and means for applying the coding mode to the first block of video data in accordance with the value of the first syntax element.

In another example of the disclosure, an apparatus configured to encode video data comprises means for determining a coding mode for encoding a first block of video data, means for explicitly encoding a first syntax element indicating if the coding mode is to be used for the first block of video data in the case that the first block of video data is associated with a number of non-zero transform coefficients greater than or equal to a threshold, and means for signaling the first syntax element in an encoded video bitstream.

In another example, this disclosure describes a computer-readable storage medium storing instructions that, when executed, cause one or more processors of a device configured to decode video data to receive a first block of the video data, receive a first syntax element indicating if a coding mode is to be used for the first block of the video data in the case that the first block of the video data is associated with a number of non-zero transform coefficients greater than or equal to a threshold, explicitly decode a value of the received first syntax element, and apply the coding mode to the first block of the video data in accordance with the value of the first syntax element.

In another example, this disclosure describes a computer-readable storage medium storing instructions that, when executed, cause one or more processors of a device configured to encode video data to determine a coding mode for encoding a first block of the video data, explicitly encode a first syntax element indicating if the coding mode is to be used for the first block of the video data in the case that the first block of the video data is associated with a number of non-zero transform coefficients greater than or equal to a threshold, and signal the first syntax element in an encoded video bitstream.

The example techniques described below for determining to explicitly code syntax elements for coding modes may be used in conjunction with one or more other techniques described in this disclosure in any combination. For example, the techniques of this disclosure for determining to explicitly code syntax elements for coding modes may be used in conjunction with techniques for coding syntax elements for transform indices, techniques for determining to explicitly code syntax elements for luma and chroma blocks, techniques for determining to explicitly code syntax elements for non-transform skip blocks, techniques for determining to explicitly code syntax elements for blocks having particular intra-prediction modes, techniques for determining to explicitly code syntax elements based on block size, and techniques for context coding syntax elements.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
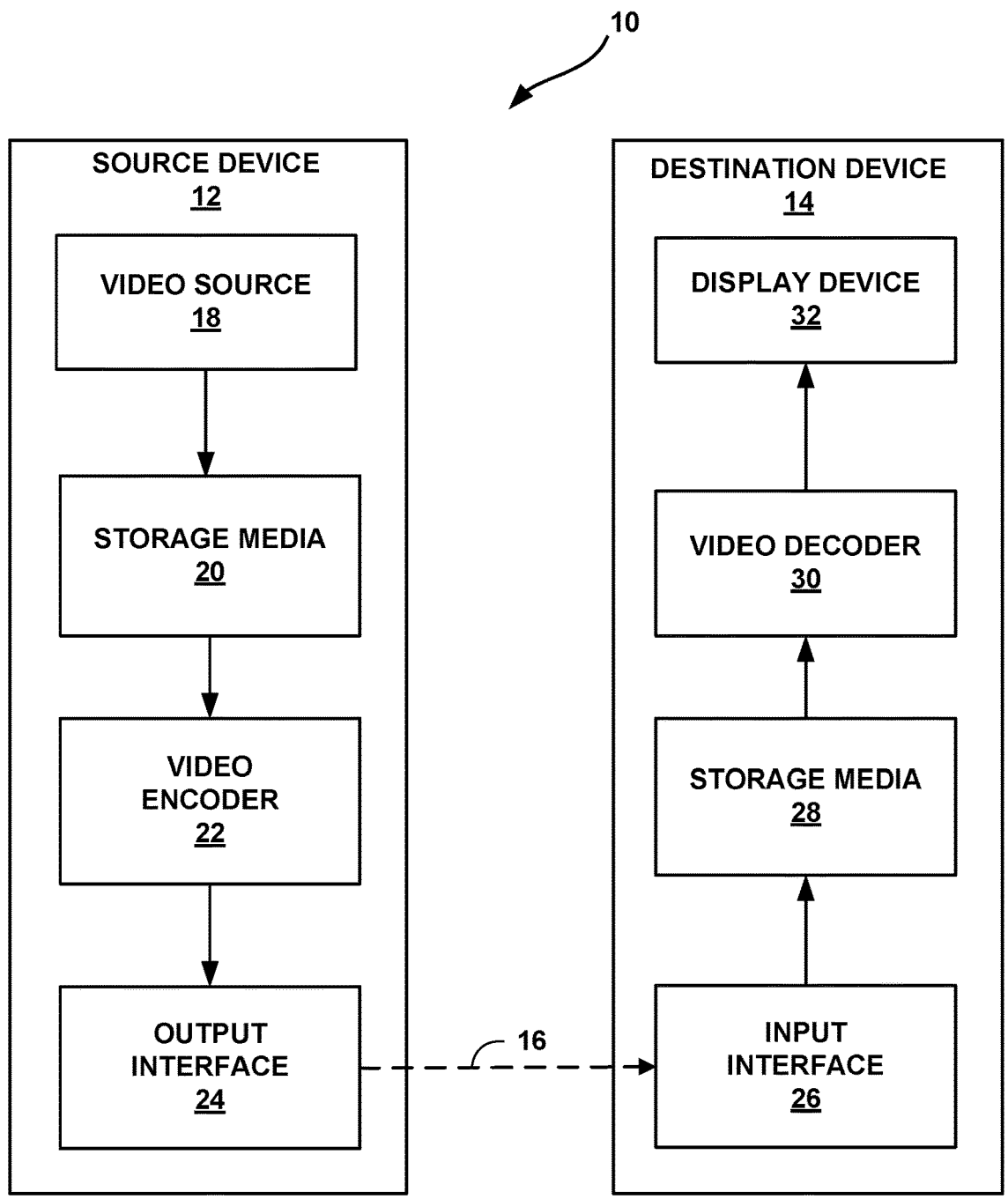
FIG. 1 is a block diagram illustrating an example video encoding and decoding system configured to implement techniques of the disclosure.

This disclosure is related to intra prediction, determination of prediction directions, determination of prediction modes, determination of coding modes, determinations for the use of intra filtering in video coding (e.g., video encoding and/or video decoding), and explicitly coding and signaling syntax elements.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), ITU-T H.265 (also known as High Efficiency Video Coding (HEVC)), including extensions such as Scalable Video Coding (SVC), Multiview Video Coding (MVC) and Screen content coding (SCC). Other video coding standards include future video coding standards, such as Joint Video Exploration Team (WET) test model, which is the development activity beyond HEVC. Video coding standards also include proprietary video codecs, such Google VP8, VP9, VP10, and video codecs developed by other organizations, for example, the Alliance for Open Media.

In HEVC and the Joint Exploratory Model (JEM), which is the test software being studied by the JVET, an intra reference can be smoothed, e.g., a filter may be applied. In HEVC, mode dependent intra smoothing (MDIS) is used in a way that a filter is applied to an intra reference (neighbor samples relative to a currently coded block) before generating intra prediction from the intra reference. Modes, for which MDIS is enabled, are derived based on how close the current intra mode is to a horizontal or vertical direction. Modes, for which MDIS is enabled, can be derived based on intra mode index absolute difference between the current mode and the horizontal and vertical mode index. If the absolute difference exceeds a certain threshold (e.g., the threshold can be block size dependent), the MDIS filter is not applied, otherwise it is applied. In other words, the intra modes that are far from horizontal or vertical directions, the intra reference filter is applied. MDIS is not applied for non-angular modes, such as DC or planar mode.

In JEM, MDIS was replaced with a smoothing filter (reference sample adaptive filtering (RSAF) or adaptive reference sample smoothing (ARSS)), which, in some examples, can be applied for all intra modes, except a DC mode. A flag, which indicates, where filter is applied or not in the current block, is signaled to the decoder side. Signaling is done not as an explicit flag, but rather is hidden in the transform coefficients. That is, the value of the flag that indicates if the filter is applied for a current block may be determined by a video decoder based on certain values or characteristics of transform coefficients. For example, if the transform coefficients satisfy a certain parity condition, the flag is derived as 1, otherwise the flag is derived as 0.

Another tool used in JEM is the position dependent intra prediction combination (PDPC) mode. PDPC is a coding mode that weights intra predictor and intra reference samples, where the weights can be derived based on block size (including width and height) and intra mode.

FIG. 1 is a block diagram illustrating an example video encoding and decoding system 10 that may be configured to perform the techniques of this disclosure. As shown in FIG. 1, system 10 includes source device 12 that provides encoded video data to be decoded at a later time by destination device 14. In particular, source device 12 provides the video data to destination device 14 via computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes video source 18, storage media 20 configured to store video data, video encoder 22, and output interface 24. Destination device 14 includes input interface 26, storage media 28 configured to store encoded video data, video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device 32.

The illustrated system 10 of FIG. 1 is merely one example. Techniques for processing and/or coding (e.g., encoding and/or decoding) video data may be performed by any digital video encoding and/or decoding device. Although the techniques of this disclosure are generally performed by a video encoding device and/or video decoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 20) configured to store the video data. The techniques described in this disclosure may be applicable to video coding, in general, and may be applied to wireless and/or wired applications. In each case, the captured, pre-captured, or computer-generated video may be encoded by video encoder 22. Output interface 24 may output the encoded video information (e.g., a bitstream of encoded video data) to computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques described in this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 22 of video encoder 22, which is also used by video decoder 30, that includes syntax elements that describe characteristics and/or processing of blocks and other coded units, e.g., groups of pictures (GOPs). Storage media 28 may store encoded video data received by input interface 26. Display device 32 displays the decoded video data to a user and may comprise any of a variety of display devices such as a cathode ray tube (CRT), a liquid crystal display (LCD), a plasma display, an organic light emitting diode (OLED) display, or another type of display device.

Video encoder 22 and video decoder 30 each may be implemented as any of a variety of suitable video encoder and/or video decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 22 and video decoder 30 may be included in one or more encoders or decoders, either of which may be integrated as part of a combined CODEC in a respective device.

In some examples, video encoder 22 and video decoder 30 may operate according to a video coding standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has been developed by the Joint Collaboration Team on Video Coding (JCT-VC) of ITU-T Video Coding Experts Group (VCEG) and ISO/IEC Motion Picture Experts Group (MPEG).

In other examples, video encoder 22 and video decoder 30 may be configured to operate according to other video coding techniques and/or standards, including new video coding techniques being explored by the Joint Video Exploration Team (WET).

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (e.g., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture (e.g., an encoded video bitstream), video encoder 22 may generate a set of coding tree units (CTUs). Each of the CTUs may comprise a coding tree block (CTB) of luma samples, two corresponding CTBs of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 22 may recursively perform quadtree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 22 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 22 may generate predictive blocks (e.g., luma, Cb, and Cr predictive blocks) for prediction blocks (e.g., luma, Cb, and Cr prediction blocks) of each PU of the CU.

Video encoder 22 may use intra prediction or inter prediction to generate the predictive blocks for a PU. If video encoder 22 uses intra prediction to generate the predictive blocks of a PU, video encoder 22 may generate the predictive blocks of the PU based on decoded samples of the picture that includes the PU.

After video encoder 22 generates predictive blocks (e.g., luma, Cb, and Cr predictive blocks) for one or more PUs of a CU, video encoder 22 may generate one or more residual blocks for the CU. As one example, video encoder 22 may generate a luma residual block for the CU. Each sample in the CU's luma residual block indicates a difference between a luma sample in one of the CU's predictive luma blocks and a corresponding sample in the CU's original luma coding block. In addition, video encoder 22 may generate a Cb residual block for the CU. In one example of chroma prediction, each sample in the Cb residual block of a CU may indicate a difference between a Cb sample in one of the CU's predictive Cb blocks and a corresponding sample in the CU's original Cb coding block. Video encoder 22 may also generate a Cr residual block for the CU. Each sample in the CU's Cr residual block may indicate a difference between a Cr sample in one of the CU's predictive Cr blocks and a corresponding sample in the CU's original Cr coding block. However, it should be understood that other techniques for chroma prediction may be used.

Furthermore, video encoder 22 may use quadtree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 22 may apply one or more transforms a transform block of a TU to generate a coefficient block for the TU. For instance, video encoder 22 may apply one or more transforms to a luma transform block of a TU to generate a luma coefficient block for the TU. A coefficient block may be a two-dimensional array of transform coefficients. A transform coefficient may be a scalar quantity. Video encoder 22 may apply one or more transforms to a Cb transform block of a TU to generate a Cb coefficient block for the TU. Video encoder 22 may apply one or more transforms to a Cr transform block of a TU to generate a Cr coefficient block for the TU.

After generating a coefficient block (e.g., a luma coefficient block, a Cb coefficient block or a Cr coefficient block), video encoder 22 may quantize the coefficient block. Quantization generally refers to a process in which transform coefficients are quantized to possibly reduce the amount of data used to represent the transform coefficients, providing further compression. After video encoder 22 quantizes a coefficient block, video encoder 22 may entropy encode syntax elements indicating the quantized transform coefficients. For example, video encoder 22 may perform context-adaptive binary arithmetic coding (CABAC) on the syntax elements indicating the quantized transform coefficients.

Video encoder 22 may output a bitstream that includes a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive an encoded video bitstream generated by video encoder 22. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 22. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some example video codec frameworks, such as the quadtree partitioning framework of HEVC, partitioning of video data into blocks for the color components (e.g., luma blocks and chroma blocks) is performed jointly. That is, in some examples, luma blocks and chroma blocks are partitioned in the same manner such that no more than one luma block corresponds to a chroma block in a particular location within a picture.

A quadtree plus binary tree (QTBT) partition structure is being studied by the Joint Video Exploration Team (WET). In J. An et al., "Block partitioning structure for next generation video coding", International Telecommunication Union, COM16-C966, September 2015 (hereinafter, "VCEG proposal COM16-C966"), QTBT partitioning techniques were described for future video coding standard beyond HEVC. Simulations have shown that the proposed QTBT structure may be more efficient than the quadtree structure used in HEVC.

In the QTBT structure described in VCEG proposal COM16-C966, a CTB is first partitioned using quadtree partitioning techniques, where the quadtree splitting of one node can be iterated until the node reaches the minimum allowed quadtree leaf node size. The minimum allowed quadtree leaf node size may be indicated to video decoder 30 by the value of the syntax element MinQTSize. If the quadtree leaf node size is not larger than the maximum allowed binary tree root node size (e.g., as denoted by a syntax element MaxBTSize), the quadtree leaf node can be further partitioned using binary tree partitioning. The binary tree partitioning of one node can be iterated until the node reaches the minimum allowed binary tree leaf node size (e.g., as denoted by a syntax element MinBTSize) or the maximum allowed binary tree depth (e.g., as denoted by a syntax element MaxBTDepth). VCEG proposal COM16-C966 uses the term "CU" to refer to binary-tree leaf nodes. In VCEG proposal COM16-C966, CUs are used for prediction (e.g., intra prediction, inter prediction, etc.) and transform without any further partitioning. In general, according to QTBT techniques, there are two splitting types for binary tree splitting: symmetric horizontal splitting and symmetric vertical splitting. In each case, a block is split by dividing the block down the middle, either horizontally or vertically. This differs from quadtree partitioning, which divides a block into four blocks.

In one example of the QTBT partitioning structure, the CTU size is set as 128×128 (e.g., a 128×128 luma block and two corresponding 64×64 chroma blocks), the MinQTSize is set as 16×16, the MaxBTSize is set as 64×64, the MinBT-Size (for both width and height) is set as 4, and the MaxBTDepth is set as 4. Quadtree partitioning is applied to the CTU first to generate quadtree leaf nodes. The quadtree leaf nodes may have a size from 16×16 (i.e., the MinQTSize is 16×16) to 128×128 (i.e., the CTU size). According to one example of QTBT partitioning, if the leaf quadtree node is 128×128, the leaf quadtree node cannot be further split by the binary tree, since the size of the leaf quadtree node exceeds the MaxBTSize (i.e., 64×64). Otherwise, the leaf quadtree node is further partitioned by the binary tree. Therefore, the quadtree leaf node is also the root node for the binary tree and has the binary tree depth as 0. The binary tree depth reaching MaxBTDepth (e.g., 4) implies that there is no further splitting. The binary tree node having a width equal to the MinBTSize (e.g., 4) implies that there is no further horizontal splitting. Similarly, the binary tree node having a height equal to MinBTSize implies no further vertical splitting. The leaf nodes of the binary tree (CUs) are further processed (e.g., by performing a prediction process and a transform process) without any further partitioning.

Figures 2A, 2B:
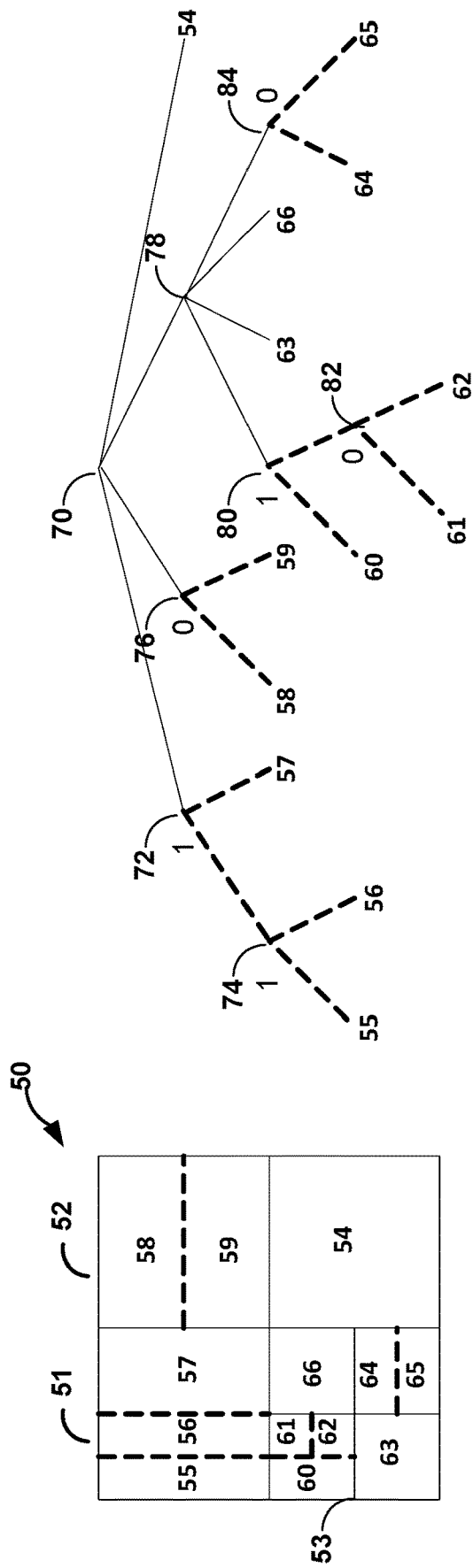
FIG. 2A is a conceptual diagram illustrating an example of block partitioning using a quadtree plus binary tree (QTBT) structure.
FIG. 2B is a conceptual diagram illustrating an example tree structure corresponding to the block partitioning using the QTBT structure of FIG. 2A.

FIG. 2A illustrates an example of a block 50 (e.g., a CTB) partitioned using QTBT partitioning techniques. As shown in FIG. 2A, using QTBT partition techniques, each of the resultant blocks is split symmetrically through the center of each block. FIG. 2B illustrates the tree structure corresponding to the block partitioning of FIG. 2A. The solid lines in FIG. 2B indicate quadtree splitting and dotted lines indicate binary tree splitting. In one example, in each splitting (i.e., non-leaf) node of the binary tree, a syntax element (e.g., a flag) is signaled to indicate the type of splitting performed (e.g., horizontal or vertical), where 0 indicates horizontal splitting and 1 indicates vertical splitting. For the quadtree splitting, there is no need to indicate the splitting type, as quadtree splitting always splits a block horizontally and vertically into 4 sub-blocks with an equal size.

As shown in FIG. 2B, at node 70, block 50 is split into the four blocks 51, 52, 53, and 54, shown in FIG. 2A, using quadtree partitioning. Block 54 is not further split and is therefore a leaf node. At node 72, block 51 is further split into two blocks using binary tree partitioning. As shown in FIG. 2B, node 72 is marked with a 1, indicating vertical splitting. As such, the splitting at node 72 results in block 57 and the block including both blocks 55 and 56. Blocks 55 and 56 are created by a further vertical splitting at node 74. At node 76, block 52 is further split into two blocks 58 and 59 using binary tree partitioning. As shown in FIG. 2B, node 76 is marked with a 1, indicating horizontal splitting.

At node 78, block 53 is split into 4 equal size blocks using quadtree partitioning. Blocks 63 and 66 are created from this quadtree partitioning and are not further split. At node 80, the upper left block is first split using vertical binary tree splitting resulting in block 60 and a right vertical block. The right vertical block is then split using horizontal binary tree splitting into blocks 61 and 62. The lower right block created from the quadtree splitting at node 78, is split at node 84 using horizontal binary tree splitting into blocks 64 and 65.

In one example of QTBT partitioning, luma and chroma partitioning may be performed independently of each other for I-slices, contrary, for example, to HEVC, where the quadtree partitioning is performed jointly for luma and chroma blocks. That is, in some examples being studied, luma blocks and chroma blocks may be partitioned separately such that luma blocks and chroma blocks do not directly overlap. As such, in some examples of QTBT partitioning, chroma blocks may be partitioned in a manner such that at least one partitioned chroma block is not spatially aligned with a single partitioned luma block. That is, the luma samples that are co-located with a particular chroma block may be within two or more different luma partitions.

The following sections describe techniques for determining parameters for a position-dependent intra prediction combination (PDPC) coding mode for blocks of video data. When coding video data using the PDPC coding mode, video encoder 22 and/or video decoder 30 may use one or more parameterized equations that define how to combine predictions based on filtered and unfiltered reference values and based on the position of the predicted pixel (or color component value of a pixel). The present disclosure describes several sets of parameters, such that video encoder 22 may be configured to test the sets of parameters (via, e.g., using rate-distortion analysis) and signal to video decoder 30 the optimal parameters (e.g., the parameters resulting in the best rate-distortion performance among those parameters that are tested). In other examples, video decoder 30 may be configured to determine PDPC parameters from characteristics of the video data (e.g., block size, block height, block width, etc.).

Figure 3B:
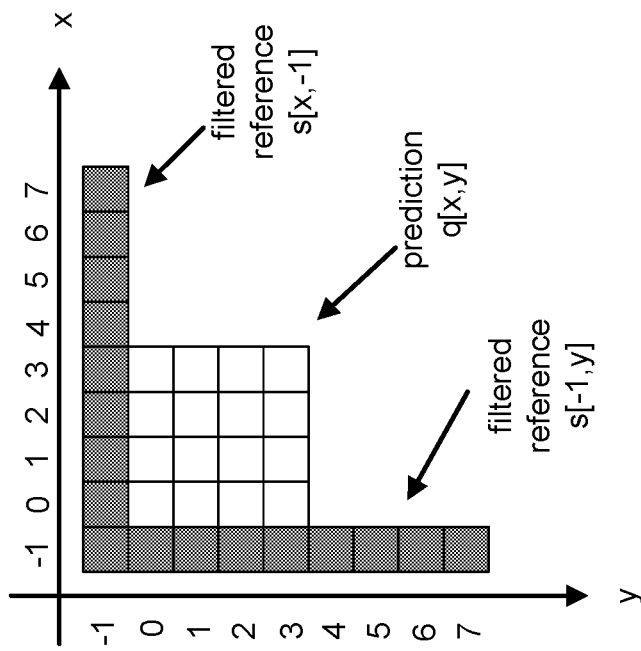
FIG. 3B illustrates a prediction of a 4×4 block using a filtered reference according to techniques of this disclosure.
Figure 3A:
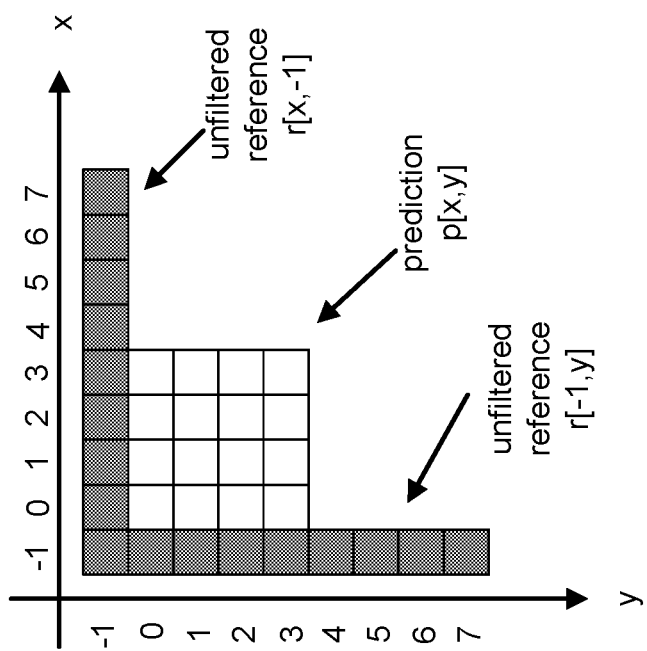
FIG. 3A illustrates a prediction of a 4×4 block using an unfiltered reference according to techniques of this disclosure.

FIG. 3A illustrates a prediction of a 4×4 block (p) using an unfiltered reference (r) according to techniques of the present disclosure. FIG. 3B illustrates a prediction of a 4×4 block (q) using a filtered reference (s) according to techniques of the present disclosure. While both FIGS. 3A and 3B illustrate a 4×4 pixel block and 17 (4×4+1) respective reference values, the techniques of the present disclosure may be applied to any block size and number of reference values.

Video encoder 22 and/or video decoder 30, when performing the PDPC coding mode, may utilize a combination between the filtered (q) and unfiltered (p) predictions, such that a predicted block for a current block to be coded can be computed using pixel values from both the filtered (s) and unfiltered (r) reference arrays.

In one example of the techniques of PDPC, given any two set of pixel predictions $p_r[x, y]$ and $q_s[x, y]$, computed using only the unfiltered and filtered references r and s, respectively, the combined predicted value of a pixel, denoted by $v[x, y]$, is defined by $$v[x,y]=c[x,y]p_r[x,y]+(1-c[x,y])q_s[x,y] \qquad (1)$$

where $c[x, y]$ is the set of combination parameters. The value of the weight $c[x, y]$ may be a value between 0 and 1. The sum of the weights $c[x, y]$ and $(1-c[x, y])$ may be equal to one.

In certain examples it may not be practical to have a set of parameters as large as the number of pixels in the block. In such examples $c[x, y]$ may be defined by a much smaller set of parameters, plus an equation to compute all combination values from those parameters. In such an example the following formula may be used:

$$v[x, y] = \qquad (2)$$

$$\left\lfloor \frac{c_1^{(v)} r[x, -1] - c_2^{(v)} r[-1, -1]}{2^{\lfloor \frac{y}{d_v} \rfloor}} \right\rfloor + \left\lfloor \frac{c_1^{(h)} r[-1, y] - c_2^{(h)} r[-1, -1]}{2^{\lfloor \frac{x}{d_h} \rfloor}} \right\rfloor +$$

-continued $$\left(\frac{N - \min(x, y)}{N}\right) g p_r^{(HEVC)}[x, y] + b[x, y] q_s^{(HEVC)}[x, y]$$

where $c_1^v$, $c_2^v$, $c_1^h$, $c_2^h$, g, and $d_v$, $d_h \in \{1,2\}$, are prediction parameters, N is the block size, $p_r[x, y]$ and $q_s[x, y]$ are prediction values computed using the according to the HEVC standard, for the specific mode, using respectively the nonfiltered and filtered references, and $$b[x, y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor y/d_h \rfloor}} \right\rfloor - \left(\frac{N - \min(x, y)}{N}\right) g \quad (3)$$

is a normalization factor (i.e., to make the overall weights assigned to $p_r^{(HEVC)}[x, y]$ and $q_s^{(HEVC)}[x, y]$ add to 1), defined by the prediction parameters.

Formula 2 may be generalized for any video coding standard in formula 2A:

$$v[x, y] = \quad (2A)$$
$$\left\lfloor \frac{c_1^{(v)} r[x, -1] - c_2^{(v)} r[-1, -1]}{2^{\lfloor \frac{y}{d_v} \rfloor}} \right\rfloor + \left\lfloor \frac{c_1^{(h)} r[-1, y] - c_2^{(h)} r[-1, -1]}{2^{\lfloor \frac{x}{d_h} \rfloor}} \right\rfloor +$$
$$\left(\frac{N - \min(x, y)}{N}\right) g p_r^{(STD)}[x, y] + b[x, y] q_s^{(STD)}[x, y]$$

where $c_1^v$, $c_2^v$, $c_1^h$, $c_2^h$, g, and $d_v$, $d_h \in \{1,2\}$, are prediction parameters, N is the block size, $p_r^{(STD)}[x, y]$ and $q_s^{(STD)}[x, y]$ are prediction values computed using the according to a video coding standard (or video coding scheme or algorithm), for the specific mode, using respectively the nonfiltered and filtered references, and $$b[x, y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor y/d_h \rfloor}} \right\rfloor - \left(\frac{N - \min(x, y)}{N}\right) g \quad (3A)$$

is a normalization factor (i.e., to make the overall weights assigned to $p_r^{(STD)}[x, y]$ and $q_s^{(STD)}[x, y]$ add to 1), defined by the prediction parameters.

These prediction parameters may include weights to provide an optimal linear combination of the predicted terms according to the type of intra prediction mode used (e.g., DC, planar, and 33 directional modes of HEVC). For example, HEVC contains 35 intra prediction modes. A lookup table may be constructed with values for each of the prediction parameters where $c_1^v$, $c_2^v$, $c_1^h$, $c_2^h$, g, and $d_v$, $d_h$ for each of the intra prediction modes (i.e., 35 values of where $c_1^v$, $c_2^v$, $c_1^h$, $c_2^h$, g, and $d_v$, $d_h$ for each intra prediction mode). Such values may be encoded in a bitstream with the video or may be constant values known by the encoder and decoder ahead of time and may not need to be transmitted in a file or bitstream. The values for $c_1^v$, $c_2^v$, $c_1^h$, $c_2^h$, g, $d_v$, and $d_h$ may be determined by an optimization training algorithm by finding the values for the prediction parameters that give best compression for a set of training videos.

In another example, there are a plurality of predefined prediction parameter sets for each intra prediction mode (in e.g. a lookup table) and the prediction parameter set selected (but not the parameters themselves) is transmitted to a decoder in an encoded file or bitstream. In another example the values for $c_1^v$, $c_2^v$, $c_1^h$, $c_2^h$, g, $d_v$, and $d_h$ may be generated on the fly by a video encoder and transmitted to a decoder in an encoded file or bitstream.

In another example, instead of using HEVC prediction, a video coding device performing these techniques may use a modified version of HEVC, like one that uses 65 directional predictions instead of 33 directional predictions. In fact, any type of intra-frame prediction can be used.

In another example, the formula can be chosen to facilitate computations. For example, we can use the following type of predictor $$v[x, y] = \left\lfloor \frac{c_1^{(v)} r[x, -1] - c_2^{(v)} r[-1, -1]}{2^{\lfloor \frac{y}{d_v} \rfloor}} \right\rfloor + \quad (4)$$
$$\left\lfloor \frac{c_1^{(h)} r[-1, y] - c_2^{(h)} r[-1, -1]}{2^{\lfloor \frac{x}{d_h} \rfloor}} \right\rfloor + b[x, y] p_{a,r,s}^{(HEVC)}[x, y]$$

where $$b[x, y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor y/d_h \rfloor}} \right\rfloor \text{ and} \quad (5)$$

$$p_{a,r,s}^{(HEVC)}[x, y] = a p_r^{(HEVC)}[x, y] + (1 - a) q_s^{(HEVC)}[x, y]. \quad (6)$$

Such an approach may exploit the linearity of the HEVC (or other) prediction. Defining h as the impulse response of a filter k from a predefined set, if we have $$s = ar + (1-a)(h*r) \quad (7)$$

where "*" represents convolution, then $$p_{a,r,s}^{(HEVC)}[x,y] = p_s^{(HEVC)}[x,y] \quad (8)$$

i.e., the linearly combined prediction may be computed from the linearly combined reference.

Formulas 4, 6 and 8 may be may be generalized for any video coding standard in formula 4A, 6A, and 8A:

$$v[x, y] = \left\lfloor \frac{c_1^{(v)} r[x, -1] - c_2^{(v)} r[-1, -1]}{2^{\lfloor y/d_v \rfloor}} \right\rfloor + \quad (4A)$$
$$\left\lfloor \frac{c_1^{(h)} r[-1, y] - c_2^{(h)} r[-1, -1]}{2^{\lfloor x/d_h \rfloor}} \right\rfloor + b[x, y] p_{a,r,s}^{(STD)}[x, y]$$

where $$b[x, y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor y/d_h \rfloor}} \right\rfloor \text{ and} \quad (5A)$$

$$p_{a,r,s}^{(STD)}[x, y] = a p_r^{(STD)}[x, y] + (1 - a) q_s^{(STD)}[x, y]. \quad (6A)$$

Such an approach may exploit the linearity of the prediction of the coding standard. Defining h as the impulse response of a filter k from a predefined set, if we have $$s = ar + (1-a)(h*r) \quad (7A)$$

where "*" represents convolution, then $$p_{a,r,s}^{(STD)}[x,y] = p_s^{(STD)}[x,y] \quad (8A)$$

i.e., the linearly combined prediction may be computed from the linearly combined reference.

In an example, prediction functions may use the reference vector (e.g., r and s) only as input. In this example, the behavior of the reference vector does not change if the reference has been filtered or not filtered. If r and s are equal (e.g., some unfiltered reference r happens to be the same as another filtered reference s) then predictive functions, e.g. $p_r[x, y]$ (also written as $p(x,y,r)$) is equal to $p_s[x, y]$ (also written as $p(x,y,s)$)), applied to filtered and unfiltered references are equal. Additionally, pixel predictions p and q may be equivalent (e.g., produce the same output given the same input). In such an example, formulas (1)-(8) may be rewritten with pixel prediction $p[x, y]$ replacing pixel prediction $q[x, y]$.

In another example, the prediction (e.g., the sets of functions) may change depending on the information that a reference has been filtered. In this example, different sets of functions can be denoted (e.g., $p_r[x, y]$ and $q_s[x, y]$). In this case, even if r and s are equal, $p_r[x, y]$ and $q_s[x, y]$ may not be equal. In other words, the same input can create different output depending on whether the input has been filtered or not. In such an example, $p[x, y]$ may not be able to be replaced by $q[x, y]$.

An advantage of the prediction equations shown is that, with the parameterized formulation, sets of optimal parameters can be determined (i.e., those that optimize the prediction accuracy), for different types of video textures, using techniques such as training. This approach, in turn, may be extended in some examples by computing several sets of predictor parameters, for some typical types of textures, and having a compression scheme where the encoder test predictors from each set, and encodes as side information the one that yields best compression.

In some examples of the techniques described above, when the PDPC coding mode is enabled, PDPC parameters used for intra prediction weighting and for controlling the use filtered or unfiltered samples of PDPC mode are pre-computed and stored in a look up table (LUT). In one example, video decoder 30 determines the PDPC parameters according to the block size and intra prediction direction. Previous techniques for PDPC coding mode assumed that intra predicted blocks are always square in size.

In HEVC and examples of JEM, an intra reference can be smoothed. For example, a filter may be applied to an intra reference. In HEVC, mode dependent intra smoothing (MDIS) is used in a way that a filter is applied to an intra reference (neighbor samples relative to a currently coded block) before generating intra prediction from the intra reference. Video encoder 22 and video decoder 30 may derive certain intra prediction modes for which MDIS is enabled based on how close the current intra prediction mode is to a horizontal or vertical direction. Modes, for which MDIS is enabled, can be derived based on intra mode index absolute difference between the current mode and the horizontal and vertical mode index. If the absolute difference exceeds a certain threshold (e.g., the threshold can be block size dependent), the MDIS filter is not applied, otherwise it is applied. In other words, the intra modes that are far from horizontal or vertical directions (e.g., as compared to a threshold), the intra reference filter is applied. In some examples, MDIS is not applied for non-angular modes, such as DC or planar mode.

In JEM, MDIS was replaced with a smoothing filter coding mode (e.g., a reference sample adaptive filtering (RSAF) or adaptive reference sample smoothing (ARSS)), which, in some examples, can be applied for all intra prediction modes, except a DC mode. In general, such techniques may be referred to as intra reference sample smoothing filters. Video encoder 22 may be configured to generate and signal a syntax element (e.g., a flag), which indicates if the intra reference sample smoothing filter is applied to the current block. In some examples, video encoder 22 may not be configured to explicitly code the syntax element indicating if the filter is applied to the current block. In the context of this disclosure, explicitly coding a syntax element refers to the actual encoding or decoding of a value of a syntax element in an encoded video bitstream. That is, explicitly coding may refer to video encoder 22 generating a value for a syntax element and explicitly encoding the value into an encoded video bitstream. Likewise, explicitly coding may refer to video decoder 30 receiving a value of a syntax element in an encoded bitstream and explicitly decoding the value of the syntax element.

In some examples, video encoder 22 is not configured to signal and explicitly encode a syntax element (e.g., a flag) which indicates if an intra reference sample smoothing filter is applied to the current block of video data. Rather, video encoder 22 is configured to "hide" the value of the flag in the transform coefficients. That is, the value of the flag that indicates if the intra reference sample smoothing filter is applied for a current block is not explicitly encoded, but rather, may be determined by video decoder 30 (e.g., implicitly decoded) based on certain values or characteristics of transform coefficients associated with the current block. For example, if the transform coefficients satisfy a certain parity condition (e.g., having a positive or negative value), video decoder 30 derives the flag as having a value of 1, otherwise video decoder 30 derives the value of the flag as 0, or vice versa.

In the context of this disclosure, the term decoding may generally encompass both explicit and implicit decoding of a value of a syntax element. In explicit decoding, an encoded syntax element is present in the encoded video bitstream. Video decoder 30 explicitly decodes the encoded syntax element to determine the value of the syntax element. In implicit decoding, the syntax element is not sent in the encoded video bitstream. Rather, video decoder 30 derives a value of the syntax element from video coding statistics (e.g., the parity of transform coefficients) based on some predetermined criteria.

Another tool used in JEM is the PDPC mode. As described above, PDPC is a coding mode that weights intra predictor and intra reference samples, where the weights can be derived based on block size (including width and height) and intra prediction mode.

The following describes example techniques of this disclosure for the determination of prediction directions, determination of prediction modes, determination of coding modes, determinations for the use of intra filtering in video coding (e.g., video encoding and/or video decoding), and explicitly coding and signaling syntax elements. The techniques disclosed herein may be used in any combination and in any conjunction with other techniques. In some examples, the coding techniques of this disclosure may be accomplished using syntax elements (e.g., flags), which can be explicitly coded and signaled, hidden in transform coefficient information or elsewhere, derived at both video encoder 22 and video decoder 30 without signaling, and the like.

The techniques of this disclosure are described with reference to intra reference sample smoothing filters and the PDPC mode (generically, "coding modes"). Intra reference sample smoothing and PDPC mode are used for illustration and description purpose. The techniques of this disclosure are not limited to those examples and the disclosed techniques can be applied to other video coding modes, techniques, and tools.

Initially, techniques related to an intra reference sample smoothing filter syntax element (e.g., a flag) are discussed. This disclosure proposes that video encoder 22 generate and/or signal an intra reference sample smoothing filter flag in an explicit way. That is, video encoder 22 may be configured to explicitly encode a syntax element that indicates if a particular coding mode (e.g., an intra reference sample smoothing filter) is to be used for coding a block of video data. For example, video encoder 22 may generate and signal an intra reference sample smoothing filter flag in an encoded video bitstream. In this way, video encoder 22 may avoid any need to modify transform coefficients to make sure that the parity condition is valid (e.g., the parity condition of the transform coefficients correctly indicates the value of the flag), as may be done when the intra smoothing flag is not explicitly coded. This technique can save noticeable complexity at video encoder 22. Video decoder 30 may be configured to receive the explicitly coded syntax element (e.g., the intra reference sample smoothing filter flag) in the encoded video bitstream, e.g., rather than deriving the value of the flag from the parity of transform coefficients. Video decoder 30 may then explicitly decode the value of the intra reference sample smoothing filter flag.

However, in some examples, coding the intra reference sample smoothing filter syntax element may be a burden for some blocks (i.e., may unbearably increase the number of bits used to code the bit). For example, where residual information related with the block is small, and few bits are used to encode the block, the bit used to signal the syntax element (e.g., the intra reference sample smoothing filter flag) may result in a higher bitrate ratio than desired. To address this potential problem, video encoder 22 may be configured to explicitly encode and signal the intra reference sample smoothing filter flag if a block of video data has a certain number of non-zero transform coefficients, or the number of non-zero transform coefficients exceeds a certain threshold. For example, the threshold can be equal to 3, meaning that if a block of video data has 3 or more non-zero transform coefficients, video encoder 22 signals (e.g., explicitly encodes) the intra reference sample smoothing filter flag. Otherwise, video encoder 22 does not explicitly encode the intra reference sample smoothing filter flag. Other threshold examples include 0, 1, 2 or any other number of non-zero transform coefficients.

As such, according to one example of the disclosure, video encoder 22 may be configured to determine a coding mode (e.g., the use of an intra reference sample smoothing filter) for encoding a first block of video data. Based on whether or not the intra reference sample smoothing filter is used for the first block of video data, video encoder 22 may be configured to explicitly encode a first syntax element (e.g., an intra reference sample smoothing filter flag) indicating if the coding mode (e.g., an intra reference sample smoothing filter) is to be used for the first block of video data in the case that the first block of video data is associated with a number of non-zero transform coefficients greater than or equal to a threshold. That is, if the first block of video data is associated with a number of non-zero transform coefficients greater than a threshold, video encoder 22 explicitly encodes the first syntax element. Video encoder 22 may signal the first syntax element in an encoded video bitstream.

For a second block of video data, video encoder 22 may be configured to not encode a value of the syntax element (e.g., an intra reference sample smoothing filter flag) indicating if the coding mode is to be used for the second block of video data in the case that the second block of video data is associated with a number of non-zero transform coefficients less than the threshold. That is, the second block of video data is associated with a number of non-zero transform coefficients less than the threshold.

In a reciprocal manner, video decoder 30 may be configured to receive the first block of video data, and receive a first syntax element (e.g., an intra reference sample smoothing filter flag) indicating if the coding mode (e.g., the use of an intra reference sample smoothing filter) is to be used for the first block of video data in the case that the first block of video data is associated with a number of non-zero transform coefficients greater than or equal to a threshold. Video decoder 30 may be further configured to explicitly decode the value of the received first syntax element, and apply the coding mode (e.g., the use of an intra reference sample smoothing filter) to the first block of video data in accordance with a value of the first syntax element.

In the case where video encoder 22 does not explicitly encode the syntax element (e.g., for the second block of video data discussed above), video decoder 30 may be configured to receive the second block of video data, infer a value of a second syntax element indicating if the coding mode (e.g., the intra reference sample smoothing filter) is to be used for the second block of video data in the case that the second block of video data is associated with a number of non-zero transform coefficients less than the threshold, and apply the coding mode (e.g., the use of an intra reference sample smoothing filter) in accordance with the inferred value of the second syntax element. As will be discussed in more detail below, video decoder 30 may be configured to use on or more techniques to infer a value of the syntax element, including inferring the value of the syntax element from characteristics of transform coefficients associated with the block of video data, and/or inferring the value of the syntax element based on some predefined default value (e.g., always apply the intra reference sample smoothing filter, never apply the intra reference sample smoothing filter, apply a default filter, etc.).

In the examples above, the coding mode is the use of an intra reference sample smoothing filter. In other examples discussed below, the coding mode indicated by the explicitly coded syntax element may be the PDC mode. However, the techniques of this disclosure may be used with other coding modes.

In some examples, video encoder 22 may be configured to compare the number of non-zero transform coefficients associated with a block of video data to the threshold jointly for both luma and chroma components of the block of video data when determining whether or not to explicitly encode a syntax element for a coding mode. That is, video encoder 22 may consider the number of non-zero coefficients for luma blocks and chroma blocks together. Video decoder 30 may be configured to perform the same comparison as video encoder 22 when determining whether or not a syntax element for a coding mode has been explicitly encoded and will be received.

In other examples, video encoder 22 may be configured to compare just non-zero transform coefficients for a luma block when determining whether or not to explicitly encode a syntax element for a coding mode. In this example, video encoder 22 may be configured to generate syntax elements for coding modes separately for luma blocks and chroma blocks. As such, further in this example, video encoder 22 may only consider non-zero transform coefficients for chroma blocks when determining whether or not to explicitly encode a syntax element for a coding mode for a chroma block. Again, video decoder 30 may be configured to perform the same comparison as video encoder 22 when determining whether or not a syntax element for a coding mode has been explicitly encoded and will be received for luma and/or chroma coding blocks.

In another example, the manner in which video encoder 22 and video decoder 30 are configured to count non-zero transform coefficients to make the determination to explicitly code a syntax element can be slice-type dependent. For example, video encoder 22 and video decoder 30 may be configured to use one technique for counting non-zero transform coefficients for I-slices and use another, different technique for counting non-zero transform coefficients for non-I-slices (e.g., P-slices or B-slices).

In another example, video encoder 22 and video decoder 30 may be configured to count non-zero transform coefficients using a technique that depends on whether luma and chroma components are coded together or separately. For example, in some partitioning structures, luma and chroma components have the same partitioning structure. In other partitioning structures (e.g., examples of QTBT partitioning), luma and chroma components may be partitioned independently, such that their respective partition structures differ from one another. In this example, separate coding can mean that luma and chroma blocks may have different partitioning representations or tree structures. In this example, when separate and/or independent luma/chroma coding is enabled for I-slices, video encoder 22 and video decoder 30 may be configured to count non-zero transform coefficients for luma components. For non-I-slices, when separate coding is not enabled, video encoder 22 and video decoder 30 may be configured to count non-zero transform coefficients jointly for both luma and chroma transform coefficients, or only for luma transform coefficients.

In another example, when video encoder 22 and video decoder 30 are configured to count non-zero coefficients for both luma and chroma components, the non-zero coefficient count is performed per component. For example, video encoder 22 and video decoder 30 may include three non-zero coefficient counters; one counter for each color component (e.g., Y, Cb, and Cr). In another example, video encoder 22 and video decoder 30 may include two counters; one counter for a luma component and one counter for both chroma components. In this example, the threshold can be set per component, and the threshold value may be different for different color components.

In one example, the threshold used for explicitly coding and/or signaling the intra reference sample smoothing filter flag is the same as a threshold used to explicitly code and signal primary and/or secondary transform indices or flags. In this example, there is some unification between different video coding techniques (e.g., between transform signaling and intra reference sample smoothing filter flag signaling), and one non-zero coefficient count and threshold may be used, which may simplify the implementation.

In another example, video encoder 22 and/or video decoder 30 may determine to explicitly code the intra reference sample smoothing filter flag based on a threshold of non-zero transform coefficients only for non-transform skip blocks. That is, for transform skip blocks, video encoder 22 and video decoder 30 may not explicitly code an intra reference sample smoothing filter flag. For non-transform skip blocks (i.e., blocks for which a transform is applied), video encoder 22 and video decoder 30 may explicitly code the intra reference sample smoothing filter flag. Transform skip is a method where horizontal or vertical transforms, or both transforms, are not applied to the residual of a block, i.e., are skipped. The transform may be any transform: primary, or secondary, or both.

In another example, video encoder 22 and/or video decoder 30 may determine to explicitly code the intra reference sample smoothing filter flag based on a threshold of non-zero transform coefficients only for blocks coded with a particular intra prediction mode. For example, video encoder 22 and/or video decoder 30 may determine to explicitly code the intra reference sample smoothing filter flag based on a threshold of non-zero transform coefficients for blocks coded with intra prediction modes other than a planar mode, a linear model (LM) prediction mode, or a DC mode. For example, if the block of an involved component (e.g., luma or chroma component) is coded using the planar mode, video encoder 22 and/or video decoder 30 would not consider the number of non-zero transform coefficients of this involved component when determining to explicitly code the intra reference sample smoothing filter flag. In this way, video encoder 22 is configured to explicitly code the intra reference sample smoothing filter flag based on an intra prediction mode used to encode the block of video data. Likewise, video decoder 30 is configured to receive the intra reference sample smoothing filter flag based on an intra prediction mode used to encode the block of video data.

In another example, in addition to comparing the number of non-zero transform coefficients to a threshold, video encoder 22 and video decoder 30 may apply a block size threshold in order to determine whether or not to explicitly code an intra reference sample smoothing filter flag. For example, video encoder 22 may be configured to explicitly code and signal an intra reference sample smoothing filter flag for blocks with a size greater than or equal to a predetermined minimum size and smaller than a predetermined maximum block size, where the minimum and maximum block sizes can be configurable or fixed for both video encoder 22 and video decoder 30. Likewise, video decoder 30 may be configured to receive and explicitly decode an intra reference sample smoothing filter flag for blocks with a size greater than or equal to a predetermined minimum size and smaller than a predetermined maximum block size.

Accordingly, in this example, video encoder 22 may be configured to explicitly code the intra reference sample smoothing filter flag in the case that the first block of video data is larger than or equal to a predetermined size. Likewise, video decoder 30 may be configured to receive and explicitly decode the intra reference sample smoothing filter flag in the case that the first block of video data is larger than or equal to a predetermined size.

The minimum block size threshold can be set to be greater than or equal to 8×8, meaning all blocks smaller than 8×8 (e.g., 4×4, 4×8, 8×4 and similar) are restricted and an intra reference sample smoothing filter flag is not signaled for such blocks. Similarly, the maximum block threshold can be, e.g., set to be 32×32. In another example, the threshold can be expressed in width*height. That is, 8×8 is converted to 64 and 32×32 is converted to 1024. To check whether the current block is restricted for explicitly coding the intra reference sample smoothing filter flag, video encoder 22 and video decoder 30 may check the width*height of the block against the threshold.

In any of the examples above where the intra reference sample smoothing filter flag is not explicitly coded and/or signaled, video decoder 30 may be configured to apply some default smoothing filter(s) to the block of video data. For example, video decoder 30 may apply an MDIS filter (which is mode dependent), video decoder 30 may apply any other filter, or video decoder 30 may apply no filtering.

In other examples of the disclosure, video encoder 22 may be configured to explicitly code and signal a flag (e.g., an intra reference sample smoothing filter flag) only for certain intra prediction modes. For example, video encoder 22 may be configured to explicitly code and signal the an intra reference sample smoothing filter flag for the intra prediction modes where MDIS can be enabled (e.g., MDIS modes), for MDIS modes and a planar mode, or for any other intra prediction mode subset of available intra prediction modes.

In another example, video encoder 22 and video decoder 33 are configured to apply an intra reference sample smoothing filter to blocks of video data that are encoded with intra prediction modes that are far (e.g., as compared to a threshold) from the horizontal or vertical directions. In addition, or optionally, video encoder 22 and video decoder 33 are configured to apply an intra reference sample smoothing filter for blocks of video data coded using a planar intra prediction mode or other non-angular intra prediction modes. Video encoder 22 and video decoder 30 may be configured to derive a subset of intra prediction modes used to determine whether or not apply an intra reference sample smoothing filter. Video encoder 22 and video decoder 33 may be configured to derive the subset based on intra prediction mode directions. In one example, video encoder 22 and video decoder 33 may be configured to derive the subset of intra prediction modes based on how far or close (e.g., based on a threshold) the index for the intra prediction modes are from the indices for horizontal, vertical, and/or diagonal intra prediction modes. Another separate subset of intra prediction modes can be assigned for non-angular directions, such as planar and/or DC intra modes and similar.

In another example, video encoder 22 and video decoder 30 are configured to explicitly code and signal an intra reference sample smoothing filter flag for different color components of a block of video data. For example, video encoder 22 and video decoder 33 are configured to explicitly code and signal a flag for the luma components. In addition, video encoder 22 and video decoder 33 are configured to explicitly code and signal one flag for chroma Cb (e.g., Chroma_Cb) and chroma Cr (e.g., Chroma_Cr) components. The signaling of the flag of one component may depend on the value of the flag already signaled for another component. For one example, video encoder 22 may be configured to explicitly encode and signal an intra reference sample smoothing filter flag for luma and chroma components. When signaling the flag for chroma, the entropy coding/parsing of that flag by video encoder 22 and video decoder 30, respectively, may depend on the value of the flag signaled for luma. The dependency can be reflected by, but not limited to, the context value.

In another example, an intra reference sample smoothing filter flag may not be signaled, but instead be derived by video decoder 30 according to the intra prediction mode index for the block of video data being decoded. For example, blocks of video data encoded using an intra prediction mode having even mode index use an intra reference sample smoothing filter (flag is enabled), and blocks of video data encoded using an intra prediction mode having an odd mode index do not have an intra reference sample smoothing filter applied (flag is disabled), or vice-versa.

In some examples, video encoder 22 and video decoder 30 may apply intra smoothing to a first block having a particular for an intra mode and not applying intra smoothing for a neighbor block having an intra mode that is close to the intra mode for the first block may provide better variety to intra prediction. This is because neighbor intra prediction mode directions (e.g., intra prediction mode direction that are right next to each other or are close to each other relative to a threshold) may provide similar intra predictors (since the direction is close), but the smoothing flag may further differentiate the predictor. In one example, video encoder 22 and video decoder 30 may be configured to perform intra smoothing for every other intra prediction modes. For example, intra smoothing may be performed for intra prediction modes having an even index and intra smoothing may not be performed for intra prediction modes having an odd index, or vice versa. In other examples, intra prediction may be performed for every third intra prediction mode, every further intra prediction mode or any subset of intra prediction modes.

In addition, there is no need to have the intra reference sample smoothing filter flag signaled explicitly, and bits can be saved. Non-angular intra prediction modes may be associated with a separate rule. For example, video encoder 22 and video decoder 30 may be configured to always apply intra reference sample smoothing for blocks of video data coded using a planar intra prediction mode. In another example, video encoder 22 and video decoder 30 may be configured to not apply intra reference sample smoothing for blocks of video data coded using a planar intra prediction mode. In still other examples, video encoder 22 and video decoder 30 may be configured to explicitly code an intra reference sample smoothing filter flag to indicate if intra reference sample smoothing is to be applied for blocks of video data coded using a planar intra prediction mode.

In some examples, context modeling (i.e., the contexts used for entropy coding, such as CABAC) for the intra reference sample smoothing filter flag entropy coding may be intra prediction mode dependent. For example, video encoder 22 and video decoder 30 may be configured to use one context to entropy code the intra reference sample smoothing filter flag for certain intra prediction modes, and video encoder 22 and video decoder 30 may be configured to use another context(s) to entropy code the intra reference sample smoothing filter flag for other intra prediction modes. The context assignment may be based on a subset of intra prediction modes of available intra prediction modes. That is, video encoder 22 and video decoder 30 may be configured to assign contexts used for coding the intra reference sample smoothing filter flag based the subset of intra prediction modes to which the intra prediction mode of the current block of video data belong. For example, the subset of intra prediction modes may be non-angular modes, angular modes, modes for which MDIS can be applied, and/or planar mode. Video encoder 22 and video decoder 30 may be configured to derive the subset to which the current block of video data belongs based on how close the current intra prediction mode is to specific modes (e.g., based on a threshold). For example, video encoder 22 and video decoder 30 may be configured to determine how close the index for a current intra prediction mode is to the index for a horizontal intra prediction mode, a vertical intra prediction mode, a diagonal intra prediction mode, or other intra prediction mode. Another separate subset may be assigned for non-angular directions, such as planar and/or DC intra modes and similar.

Techniques PDPC mode signaling will now be discussed. In one example of the disclosure, PDPC mode usage can be restricted, and video encoder 22 is configured to not signal a PDPC flag for the restricted cases. The PDPC flag, or more generically PDPC syntax element, indicates if PDPC mode is used for a particular block of video data. The restriction can be imposed similarly to the techniques for the intra reference sample smoothing filter flag discussed above.

In one example, video encoder 22 may be configured to explicitly encode and signal the PDPC mode flag if a block of video data has a certain number of non-zero transform coefficients, or the number of non-zero transform coefficients exceeds a certain threshold. For example, the threshold can be equal to 3, meaning that if a block of video data has 3 or more non-zero transform coefficients, video encoder 22 signals (e.g., explicitly encodes) the PDPC mode flag. Otherwise, video encoder 22 does not explicitly encode the PDPC mode flag. In some examples, the threshold may be the same as used for signaling transform indices. Other threshold examples include 0, 1, 2 or any other number of non-zero transform coefficients. In one example, the threshold is equal to 2, meaning that video encoder 22 signals the PDPC mode flag if the block of video data has more than 1 non-zero transform coefficient.

As such, according to one example of the disclosure, video encoder 22 may be configured to determine a coding mode (e.g., the use of PDPC mode) for encoding a first block of video data. Based on whether or not the PDPC mode is used for the first block of video data, video encoder 22 may be configured to explicitly encode a first syntax element (e.g., a PDPC mode flag) indicating if the coding mode (e.g., a PDPC mode) is to be used for the first block of video data in the case that the first block of video data is associated with a number of non-zero transform coefficients greater than or equal to a threshold. That is, if the first block of video data is associated with a number of non-zero transform coefficients greater than a threshold, video encoder 22 explicitly encodes the first syntax element. Video encoder 22 may signal the first syntax element in an encoded video bitstream.

For a second block of video data, video encoder 22 may be configured to not encode a value of the syntax element (e.g., a PDPC mode flag) indicating if the coding mode is to be used for the second block of video data in the case that the second block of video data is associated with a number of non-zero transform coefficients less than the threshold. That is, the second block of video data is associated with a number of non-zero transform coefficients less than the threshold.

In a reciprocal manner, video decoder 30 may be configured to receive the first block of video data, and receive a first syntax element (e.g., a PDPC mode flag) indicating if the coding mode (e.g., the use of PDPC mode) is to be used for the first block of video data in the case that the first block of video data is associated with a number of non-zero transform coefficients greater than or equal to a threshold. Video decoder 30 may be further configured to explicitly decode the value of the received first syntax element, and apply the coding mode (e.g., the PDPC mode) to the first block of video data in accordance with a value of the first syntax element.

In the case where video encoder 22 does not explicitly encode the syntax element (e.g., for the second block of video data discussed above), video decoder 30 may be configured to receive the second block of video data, infer a value of a second syntax element indicating if the coding mode (e.g., the PDPC mode) is to be used for the second block of video data in the case that the second block of video data is associated with a number of non-zero transform coefficients less than the threshold, and apply the coding mode (e.g., the PDPC mode) in accordance with the inferred value of the second syntax element.

In some examples, video encoder 22 may be configured to compare the number of non-zero transform coefficients associated with a block of video data to the threshold jointly for both luma and chroma components of the block of video data when determining whether or not to explicitly encode a syntax element for a coding mode (e.g., PDPC mode). That is, video encoder 22 may consider the number of non-zero coefficients for luma blocks and chroma blocks together. Video decoder 30 may be configured to perform the same comparison as video encoder 22 when determining whether or not a syntax element for a coding mode has been explicitly encoded and will be received.

In other examples, video encoder 22 may be configured to compare just non-zero transform coefficients for a luma block when determining whether or not to explicitly encode a syntax element for a coding mode (e.g., PDPC mode). In this example, video encoder 22 may be configured to generate syntax elements for coding modes separately for luma blocks and chroma blocks. As such, further in this example, video encoder 22 may only consider non-zero transform coefficients for chroma blocks when determining whether or not to explicitly encode a syntax element for a coding mode (e.g., PDPC mode) for a chroma block. Again, video decoder 30 may be configured to perform the same comparison as video encoder 22 when determining whether or not a syntax element for a coding mode has been explicitly encoded and will be received for luma and/or chroma coding blocks.

In another example, the manner in which video encoder 22 and video decoder 30 are configured to count non-zero transform coefficients to make the determination to explicitly encode a syntax element can be slice-type dependent. For example, video encoder 22 and video decoder 30 may be configured to use one technique for counting non-zero transform coefficients for I-slices and use another, different technique for counting non-zero transform coefficients for non-I-slices (e.g., P-slices or B-slices).

In another example, video encoder 22 and video decoder 30 may be configured to count non-zero transform coefficients using a technique that depends on whether luma and chroma components are coded together or separately. For example, in some partitioning structures, luma and chroma components have the same partitioning structure. In other partitioning structures (e.g., examples of QTBT partitioning), luma and chroma components may be partitioned independently, such that their respective partition structures differ from one another. In this example, separate coding can mean that luma and chroma blocks may have different partitioning representations or tree structures. In this example, when separate and/or independent luma/chroma coding is enabled for I-slices, video encoder 22 and video decoder 30 may be configured to count non-zero transform coefficients for luma components. For non-I-slices, when separate coding is not enabled, video encoder 22 and video decoder 30 may be configured to count non-zero transform coefficients jointly for both luma and chroma transform coefficients, or only for luma transform coefficients.

In another example, when video encoder 22 and video decoder 30 are configured to count non-zero coefficients for both luma and chroma components, the non-zero coefficient count is performed per component. For example, video encoder 22 and video decoder 30 may include three non-zero coefficient counters; one counter for each color component (e.g., Y, Cb, and Cr). In another example, video encoder 22 and video decoder 30 may include two counters; one counter for a luma component and one counter for both chroma components. In this example, the threshold can be set per component, and the threshold value may be different for different color components.

In another example, video encoder 22 and/or video decoder 30 may determine to explicitly code the PDPC mode flag based on a threshold of non-zero transform coefficients only for non-transform skip blocks. That is, for transform skip blocks, video encoder 22 and video decoder 30 may not explicitly code a PDPC mode flag. For non-transform skip blocks (i.e., blocks for which a transform is applied), video encoder 22 and video decoder 30 may explicitly code the PDPC mode flag. Transform skip is a method where horizontal or vertical transforms, or both transforms, are not applied to the residual of a block, i.e., are skipped. The transform may be any transform: primary, or secondary, or both.

In another example, video encoder 22 and/or video decoder 30 may determine to explicitly code the PDPC mode flag based on a threshold of non-zero transform coefficients only for blocks coded with a particular intra prediction mode. For example, video encoder 22 and/or video decoder 30 may determine to explicitly code the PDPC mode flag based on a threshold of non-zero transform coefficients for blocks coded with intra prediction modes other than a planar mode, a linear model (LM) prediction mode, or a DC mode. For example, if the block of an involved component (e.g., luma or chroma component) is coded using the planar mode, video encoder 22 and/or video decoder 30 would not consider the number of non-zero transform coefficients of this involved component when determining to explicitly code the PDPC mode flag. In this way, video encoder 22 is configured to explicitly code the PDPC mode flag based on an intra prediction mode used to encode the block of video data. Likewise, video decoder 30 is configured to receive the PDPC mode flag based on an intra prediction mode used to encode the block of video data.

In another example, in addition to comparing the number of non-zero transform coefficients to a threshold, video encoder 22 and video decoder 30 may apply a block size threshold in order to determine whether or not to explicitly code a PDPC mode flag. For example, video encoder 22 may be configured to explicitly code and signal a PDPC mode flag for blocks with a size greater than or equal to a predetermined minimum size and smaller than a predetermined maximum block size, where the minimum and maximum block sizes can be configurable or fixed for both video encoder 22 and video decoder 30. Likewise, video decoder 30 may be configured to receive and explicitly decode a PDPC mode flag for blocks with a size greater than or equal to a predetermined minimum size and smaller than a predetermined maximum block size.

Accordingly, in this example, video encoder 22 may be configured to explicitly code the PDPC mode flag in the case that the first block of video data is larger than or equal to a predetermined size. Likewise, video decoder 30 may be configured to receive and explicitly decode the PDPC mode flag in the case that the first block of video data is larger than or equal to a predetermined size.

The minimum block size threshold can be set to be greater than or equal to 8×8, meaning all blocks smaller than 8×8 (e.g., 4×4, 4×8, 8×4 and similar) are restricted and a PDPC mode flag is not signaled for such blocks. Similarly, the maximum block threshold can be, e.g., set to be 32×32. In another example, the threshold can be expressed in width*height. That is, 8×8 is converted to 64 and 32×32 is converted to 1024. To check whether the current block is restricted for explicitly coding the PDPC mode flag, video encoder 22 and video decoder 30 may check the width*height of the block against the threshold.

In any of the examples above where the intra reference sample smoothing filter flag is not explicitly coded and/or signaled, video decoder 30 may be configured to derive some default value for the PDPC mode flag for certain intra prediction mode(s).

In one example, for some smooth intra prediction modes, e.g., planar mode, PDPC mode is always applied.

In another example, video encoder 22 and video decoder 30 are configured to explicitly code and signal a PDPC mode flag for different color components of a block of video data. For example, video encoder 22 and video decoder 33 are configured to explicitly code and signal a flag for the luma components. In addition, video encoder 22 and video decoder 33 are configured to explicitly code and signal one flag for chroma Cb (e.g., Chroma_Cb) and chroma Cr (e.g., Chroma_Cr) components. The signaling of the flag of one component may depend on the value of the flag already signaled for another component. For one example, video encoder 22 may be configured to explicitly encode and signal a PDPC mode flag for luma and chroma components. When signaling the flag for chroma, the entropy coding/parsing of that flag by video encoder 22 and video decoder 30, respectively, may depend on the value of the flag signaled for luma. The dependency can be reflected by, but not limited to, the context value.

Additionally, or alternatively, PDPC mode restriction can be performed based on intra prediction mode basis. For example, video encoder 22 and video decoder 30 may be configured to not apply PDPC mode, and video encoder 22 is configured to not explicitly encode a PDCPC mode flag, for certain intra prediction modes or for some subset of intra prediction modes subset. Video encoder 22 and video decoder 30 may be configured to derive the subset to which the current block of video data belongs based on how close the current intra prediction mode is to specific modes (e.g., based on a threshold). For example, video encoder 22 and video decoder 30 may be configured to determine how close the index for a current intra prediction mode is to the index for a horizontal intra prediction mode, a vertical intra prediction mode, a diagonal intra prediction mode, or other intra prediction mode. Another separate subset may be assigned for non-angular directions, such as planar and/or DC intra modes and similar. In one specific example, PDPC mode is not applied for planar mode.

In another example, PDPC mode can be combined with other video coding tools or techniques such as secondary transform and/or intra reference sample smoothing filters described above. This combination can be allowed for certain intra modes, and the PDPC flag mode is signaled for the cases PDPC mode is allowed. Intra mode selection may be one of the examples described above.

In some examples, context modeling (i.e., the contexts used for entropy coding, such as CABAC) for the PDPC mode flag entropy coding may be intra prediction mode and/or block size dependent. For example, video encoder 22 and video decoder 30 may be configured to use one context to entropy code the PDPC mode flag for certain intra prediction modes, and video encoder 22 and video decoder 30 may be configured to use another context(s) to entropy code the PDPC mode flag for other intra prediction modes. The context assignment may be based on a subset of intra prediction modes of available intra prediction modes. That is, video encoder 22 and video decoder 30 may be configured to assign contexts used for coding the PDPC mode flag based the subset of intra prediction modes to which the intra prediction mode of the current block of video data belong. For example, the subset of intra prediction modes may be non-angular modes, angular modes, modes for which MDIS can be applied, and/or planar mode. Video encoder 22 and video decoder 30 may be configured to derive the subset to which the current block of video data belongs based on how close the current intra prediction mode is to specific modes (e.g., based on a threshold). For example, video encoder 22 and video decoder 30 may be configured to determine how close the index for a current intra prediction mode is to the index for a horizontal intra prediction mode, a vertical intra prediction mode, a diagonal intra prediction mode, or other intra prediction mode. Another separate subset may be assigned for non-angular directions, such as planar and/or DC intra modes and similar.

Figure 4:
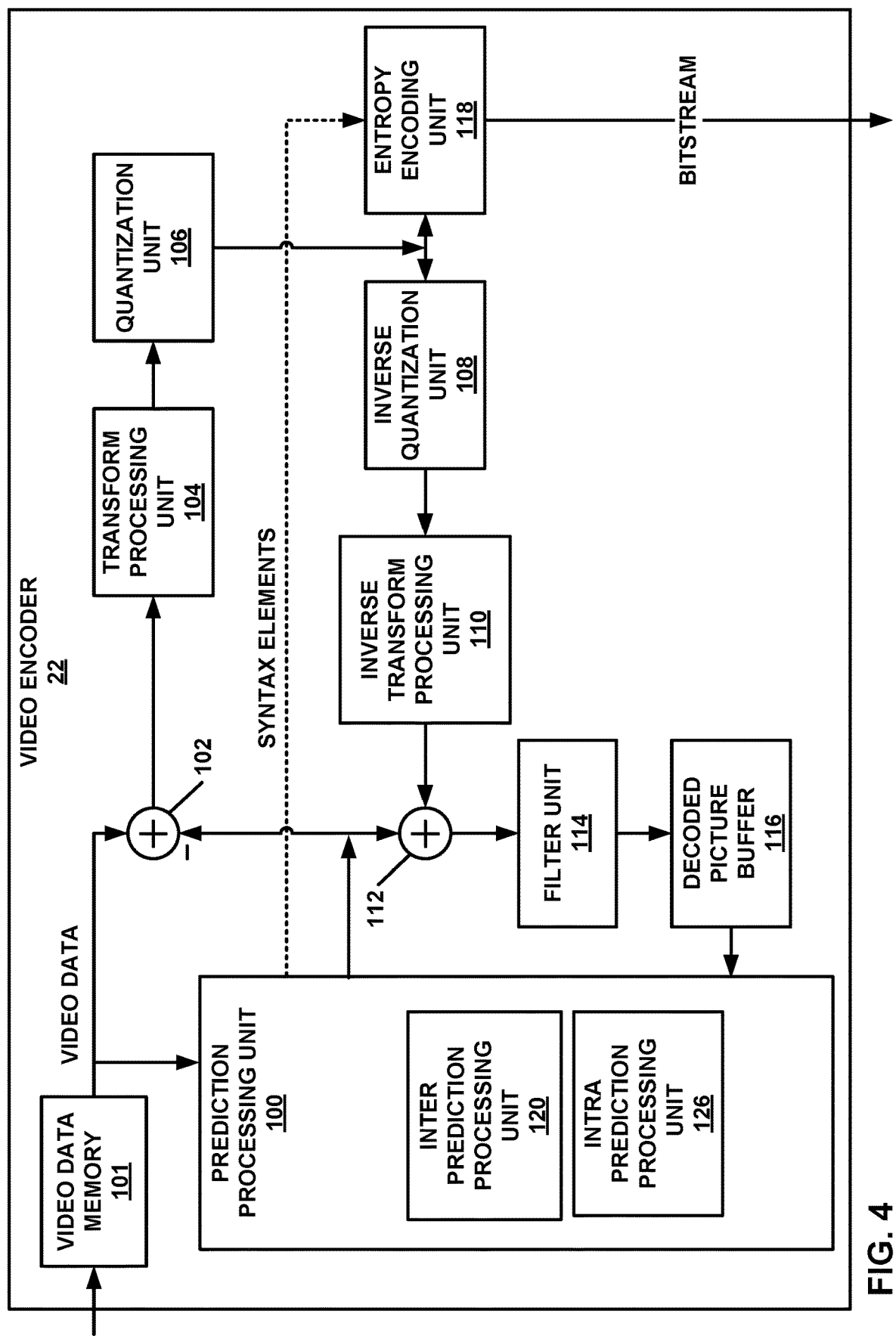
FIG. 4 is a block diagram illustrating an example of a video encoder configured to implement techniques of the disclosure.

FIG. 4 is a block diagram illustrating an example video encoder 22 that may implement the techniques of this disclosure. FIG. 4 is provided for purposes of explanation and should not be considered limiting of the techniques as broadly exemplified and described in this disclosure. The techniques of this disclosure may be applicable to various coding standards or methods.

In the example of FIG. 4, video encoder 22 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter prediction processing unit 120 and an intra prediction processing unit 126. Inter prediction processing unit 120 may include a motion estimation unit and a motion compensation unit (not shown).

Video data memory 101 may be configured to store video data to be encoded by the components of video encoder 22. The video data stored in video data memory 101 may be obtained, for example, from video source 18. Decoded picture buffer 116 may be a reference picture memory that stores reference video data for use in encoding video data by video encoder 22, e.g., in intra- or inter-prediction modes. Video data memory 101 and decoded picture buffer 116 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 22, or off-chip relative to those components. Video data memory 101 may be the same as or part of storage media 20 of FIG. 1.

Video encoder 22 receives video data. Video encoder 22 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. In some examples, video encoder 22 may partition blocks using a QTBT structure. The smaller blocks may be coding blocks of CUs. For example, prediction processing unit 100 may partition a CTB associated with a CTU according to a tree structure. In accordance with one or more techniques of this disclosure, for each respective non-leaf node of the tree structure at each depth level of the tree structure, there are a plurality of allowed splitting patterns for the respective non-leaf node and the video block corresponding to the respective non-leaf node is partitioned into video blocks corresponding to the child nodes of the respective non-leaf node according to one of the plurality of allowable splitting patterns.

Video encoder 22 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 22 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 22 and video decoder 30 may support PU sizes of 2N×2N or N×N for intra prediction, and symmetric PU sizes of 2N×2N, 2N×N, N×2N, N×N, or similar for inter prediction. Video encoder 22 and video decoder 30 may also support asymmetric partitioning for PU sizes of 2N×nU, 2N×nD, nL×2N, and nR×2N for inter prediction.

Inter prediction processing unit 120 may generate predictive data for a PU by performing inter prediction on each PU of a CU. The predictive data for the PU may include predictive blocks of the PU and motion information for the PU. Inter prediction processing unit 120 may perform different operations for a PU of a CU depending on whether the PU is in an I slice, a P slice, or a B slice. In an I slice, all PUs are intra predicted. Hence, if the PU is in an I slice, inter prediction processing unit 120 does not perform inter prediction on the PU. Thus, for blocks encoded in I-mode, the predicted block is formed using spatial prediction from previously-encoded neighboring blocks within the same frame. If a PU is in a P slice, inter prediction processing unit 120 may use uni-directional inter prediction to generate a predictive block of the PU. If a PU is in a B slice, inter prediction processing unit 120 may use uni-directional or bi-directional inter prediction to generate a predictive block of the PU.

Intra prediction processing unit 126 may generate predictive data for a PU by performing intra prediction on the PU. The predictive data for the PU may include predictive blocks of the PU and various syntax elements. Intra prediction processing unit 126 may perform intra prediction on PUs in I slices, P slices, and B slices. Intra prediction processing unit 126 may be configured to determine one or more coding modes to apply when predicting a block of video data using intra prediction, including applying an intra reference sample smoothing filter and/or a PDPC mode. Intra prediction processing unit 126 and/or another component of video encoder 22 may be configured to perform the explicit coding techniques described above for intra reference sample smoothing filter and PDPC mode syntax coding.

To perform intra prediction on a PU, intra prediction processing unit 126 may use multiple intra prediction modes to generate multiple sets of predictive data for the PU. Intra prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter prediction processing unit 120 for the PUs or the predictive data generated by intra prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quadtree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quadtree structure known as a "residual quadtree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 22 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 22 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter prediction processing unit 120 may use a reference picture that contains the reconstructed coding blocks to perform inter prediction on PUs of other pictures. In addition, intra prediction processing unit 126 may use reconstructed coding blocks in decoded picture buffer 116 to perform intra prediction on other PUs in the same picture as the CU.

Entropy encoding unit 118 may receive data from other functional components of video encoder 22. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 22 may output a bitstream that includes entropy-encoded data generated by entropy encoding unit 118. For instance, the bitstream may include data that represents a RQT for a CU.

Figure 5:
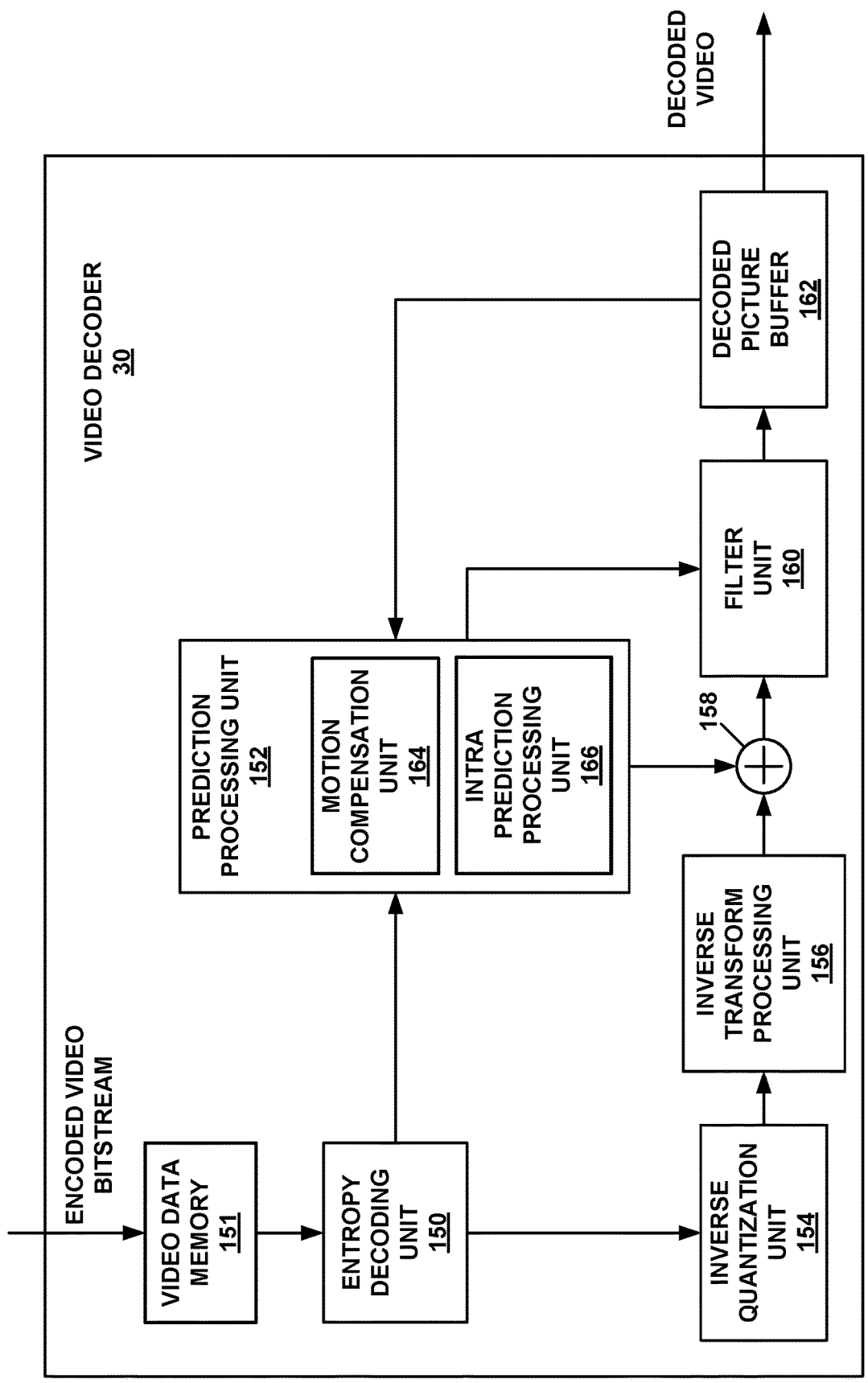
FIG. 5 is a block diagram illustrating an example of a video decoder configured to implement techniques of the disclosure.

FIG. 5 is a block diagram illustrating an example video decoder 30 that is configured to implement the techniques of this disclosure. FIG. 5 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods, including techniques that allow for non-square partitioning and/or independent luma and chroma partitioning.

In the example of FIG. 5, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-prediction modes, or for output. Video data memory 151 and decoded picture buffer 162 may be formed by any of a variety of memory devices, such as DRAM), including SDRAM, MRAM, RRAM, or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In accordance with some examples of this disclosure, entropy decoding unit 150 may determine a tree structure as part of obtaining the syntax elements from the bitstream. The tree structure may specify how an initial video block, such as a CTB, is partitioned into smaller video blocks, such as coding units. In accordance with one or more techniques of this disclosure, for each respective non-leaf node of the tree structure at each depth level of the tree structure, there are a plurality of allowed splitting patterns for the respective non-leaf node and the video block corresponding to the respective non-leaf node is partitioned into video blocks corresponding to the child nodes of the respective non-leaf node according to one of the plurality of allowable splitting patterns.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra prediction processing unit 166 may perform intra prediction to generate predictive blocks of the PU. Intra prediction processing unit 166 may use an intra prediction mode to generate the predictive blocks of the PU based on samples spatially-neighboring blocks. Intra prediction processing unit 166 may determine the intra prediction mode for the PU based on one or more syntax elements obtained from the bitstream. Intra prediction processing unit 166 may be configured to determine one or more coding modes to apply when predicting a block of video data using intra prediction, including applying an intra reference sample smoothing filter and/or a PDPC mode. Intra prediction processing unit 166 and/or another component of video decoder 30 may be configured to perform the explicit coding techniques described above for intra reference sample smoothing filter and PDPC mode syntax coding.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra prediction data or inter prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Figure 6:
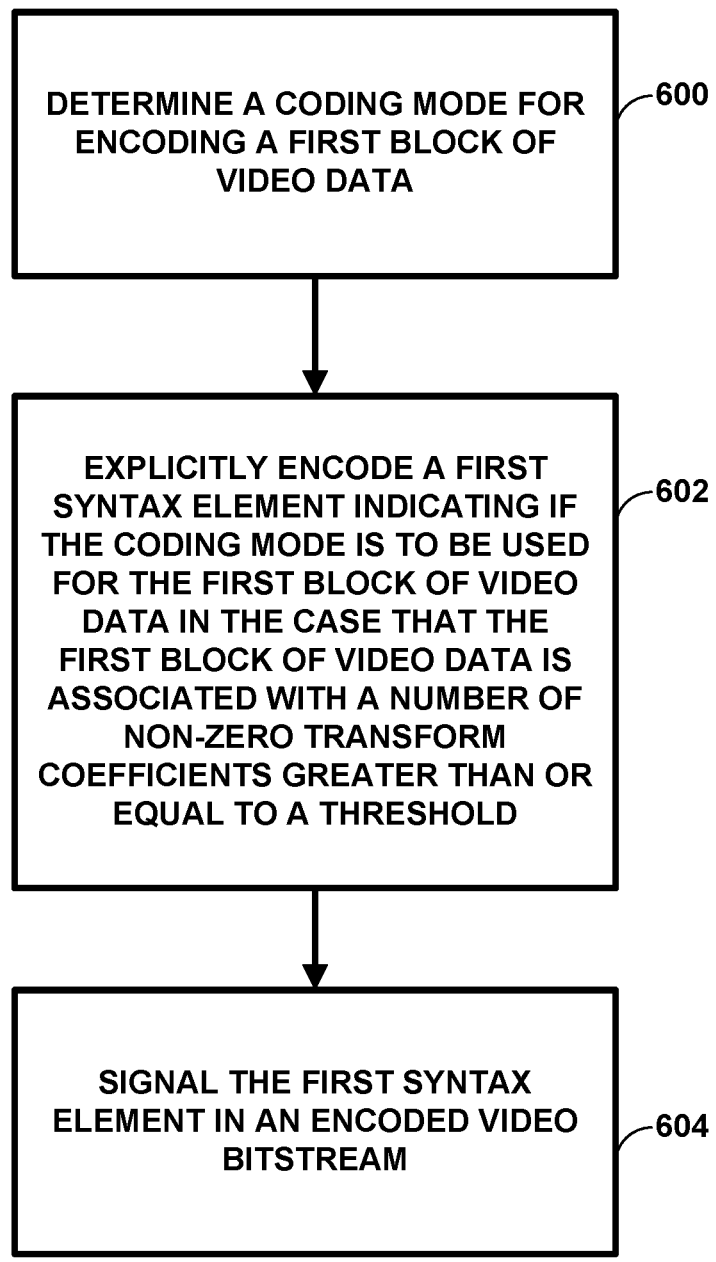
FIG. 6 is a flowchart illustrating an example encoding method of the disclosure.

FIG. 6 is a flowchart illustrating an example encoding method of the disclosure. The techniques of FIG. 6 may be performed by one or more structural components of video encoder 22.

In one example of the disclosure, video encoder 22 may be configured to determine a coding mode for encoding a first block of video data (600). In one example of the disclosure, the coding mode is at least one of an intra reference sample smoothing mode or a PDPC mode. Video encoder 22 may also be configured to explicitly encode a first syntax element indicating if the coding mode is to be used for the first block of video data in the case that the first block of video data is associated with a number of non-zero transform coefficients greater than or equal to a threshold (602). In one example of the disclosure, the threshold is one of 1, 2, or 3 non-zero coefficients. Video encoder 22 may also signal the first syntax element in an encoded video bitstream (604).

In another example of the disclosure, to explicitly encode the first syntax element, video encoder 22 may be further configured to explicitly encode the first syntax element based on an intra prediction mode used to encode the first block of video data.

In another example of the disclosure, to explicitly encode the first syntax element, video encoder 22 may be further configured to explicitly encode the first syntax element in the case that the first block of video data is larger than or equal to a predetermined size.

In another example of the disclosure, the number of non-zero transform coefficients includes the number of non-zero transform coefficients for both luma and chroma components of the first block of video data. In another example of the disclosure, the first block of video data includes a luma block of video data, and the number of non-zero transform coefficients include the number of non-zero transform coefficients for the luma block of video data. In another example of the disclosure, the first block of video data is not a transform skip block.

In another example of the disclosure, video encoder 22 is further configured to determine a context for encoding the first syntax element based on an intra prediction mode used to encode the first block of video data, and encode the first syntax element using the determined context.

In another example of the disclosure, video encoder 22 is further configured to determine a coding mode for encoding a second block of video data, and not encode a value of a second syntax element indicating if the coding mode is to be used for the second block of video data in the case that the second block of video data is associated with a number of non-zero transform coefficients less than the threshold.

Figure 7:
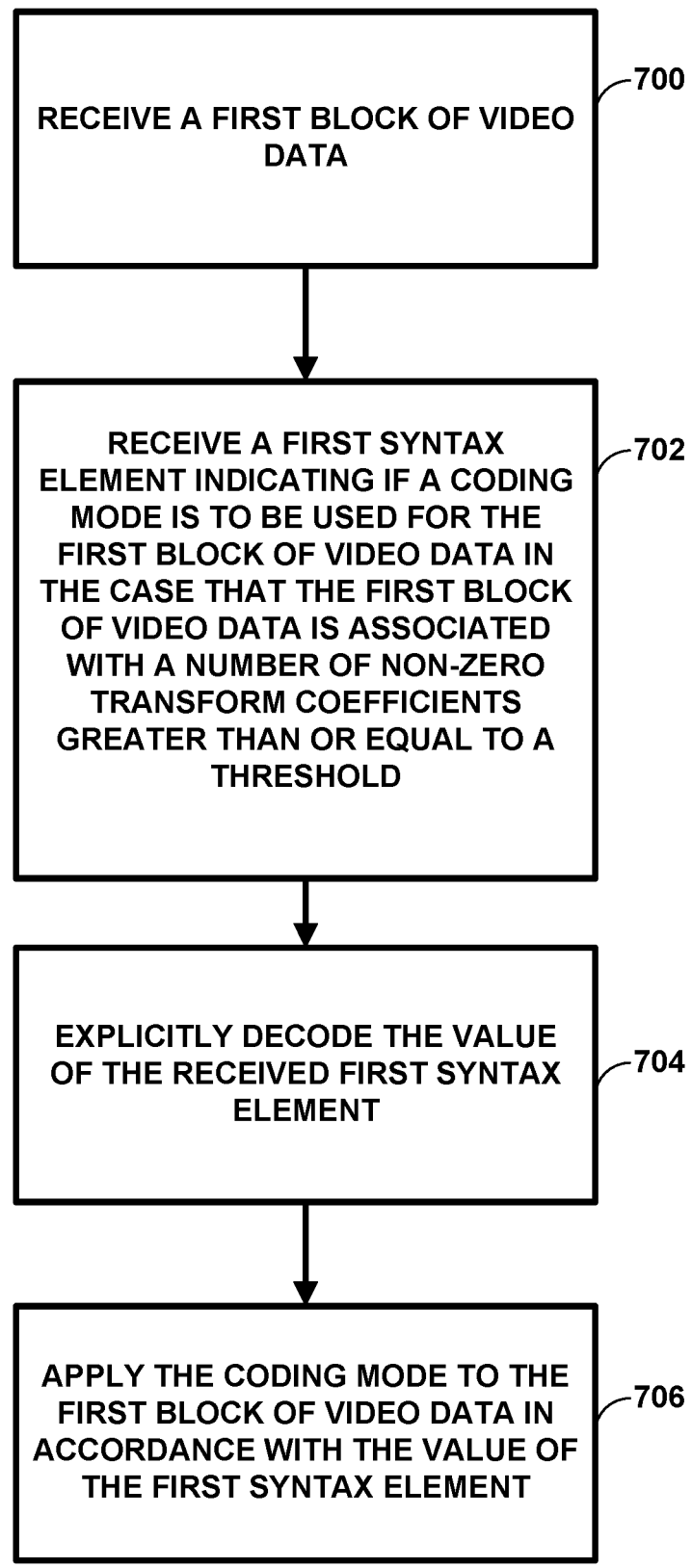
FIG. 7 is a flowchart illustrating an example decoding method of the disclosure.

FIG. 7 is a flowchart illustrating an example decoding method of the disclosure. The techniques of FIG. 7 may be performed by one or more structural components of video decoder 30.

In one example of the disclosure, video decoder 30 may be configured to receive a first block of video data (700). Video decoder 30 may be further configured to receive a first syntax element indicating if a coding mode is to be used for the first block of video data in the case that the first block of video data is associated with a number of non-zero transform coefficients greater than or equal to a threshold (702), and explicitly decode the value of the received first syntax element (704). In one example of the disclosure, the threshold is one of 1, 2, or 3 non-zero coefficients. Video decoder 30 may apply the coding mode to the first block of video data in accordance with a value of the first syntax element (706). In one example of the disclosure, the coding mode is at least one of an intra reference sample smoothing mode or a PDPC mode.

In another example of the disclosure, to receive the first syntax element, video decoder 30 may be further configured to receive the first syntax element based on an intra prediction mode used to encode the first block of video data.

In another example of the disclosure, to receive the first syntax element, video decoder 30 may be further configured to receive the first syntax element in the case that the first block of video data is larger than or equal to a predetermined size.

In another example of the disclosure, the number of non-zero transform coefficients includes the number of non-zero transform coefficients for both luma and chroma components of the first block of video data. In another example, the first block of video data includes a luma block of video data, and the number of non-zero transform coefficients include the number of non-zero transform coefficients for the luma block of video data. In another example, the first block of the video data is not a transform skip block.

In another example of the disclosure, video decoder 30 may be configured to determine a context for decoding the first syntax element based on an intra prediction mode used to encode the first block of video data, and decode the first syntax element using the determined context.

In another example of the disclosure, video decoder 30 may be configured to receive a second block of video data, infer a value of a second syntax element indicating if the coding mode is to be used for second block of the video data in the case that the second block the video data is associated with a number of non-zero transform coefficients less than the threshold, and apply the coding mode in accordance with the inferred value of the second syntax element.

Certain aspects of this disclosure have been described with respect to extensions of the HEVC standard and the JEM software model being studied by the JVET for purposes of illustration. However, the techniques described in this disclosure may be useful for other video coding processes, including other standard or proprietary video coding processes under development or not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving a first block of video data, the first block being associated with a first number of non-zero transform coefficients greater than or equal to a threshold;
   receiving a first syntax element indicating whether a position dependent intra prediction combination (PDPC) coding mode is to be used for the first block of video data;
   explicitly decoding a value of the received first syntax element;
   applying the PDPC coding mode to the first block of video data in accordance with the value of the first syntax element;
   receiving a second block of video data, the second block being associated with a second number of non-zero transform coefficients less than the threshold;
   inferring a value of a second syntax element indicating whether the PDPC coding mode is to be used for the second block of video data; and
   applying the PDPC coding mode in accordance with the inferred value of the second syntax element.

2. The method of claim 1, wherein receiving the first syntax element further comprises receiving the first syntax element based on an intra prediction mode used to encode the first block of video data.

3. The method of claim 1, wherein receiving the first syntax element further comprises receiving the first syntax element in the case that the first block of video data is larger than or equal to a predetermined size.

4. The method of claim 1, wherein the threshold is one of 1, 2, or 3 non-zero coefficients.

5. The method of claim 1, wherein the first number of non-zero transform coefficients includes the first number of non-zero transform coefficients for both luma and chroma components of the first block of video data.

6. The method of claim 1, wherein the first block of video data includes a luma block of video data, and wherein the first number of non-zero transform coefficients include the first number of non-zero transform coefficients for the luma block of video data.

7. The method of claim 1, wherein the first block of video data is not a transform skip block.

8. The method of claim 1, further comprising:
   determining a context for decoding the first syntax element based on an intra prediction mode used to encode the first block of video data; and
   decoding the first syntax element using the determined context.

9. A method of encoding video data, the method comprising:
   determining whether to use a position dependent intra prediction combination (PDPC) coding mode for encoding a first block of video data;
   explicitly encoding a first syntax element indicating whether the PDPC coding mode is to be used for the first block of video data based on the first block of video data being associated with a first number of non-zero transform coefficients greater than or equal to a threshold;
   signaling the first syntax element in an encoded video bitstream;
   determining whether to use the PDPC coding mode for encoding a second block of video data; and
   not encoding a second syntax element indicating whether the PDPC coding mode is to be used for the second block of video data based on the second block of video data being associated with a second number of non-zero transform coefficients less than the threshold.

10. The method of claim 9, wherein explicitly encoding the first syntax element further comprises explicitly encoding the first syntax element based on an intra prediction mode used to encode the first block of video data.

11. The method of claim 9, wherein explicitly encoding the first syntax element further comprises explicitly encoding the first syntax element in the case that the first block of video data is larger than or equal to a predetermined size.

12. The method of claim 9, wherein the threshold is one of 1, 2, or 3 non-zero coefficients.

13. The method of claim 9, wherein the first number of non-zero transform coefficients includes the first number of non-zero transform coefficients for both luma and chroma components of the first block of video data.

14. The method of claim 9, wherein the first block of video data includes a luma block of video data, and wherein the first number of non-zero transform coefficients include the first number of non-zero transform coefficients for the luma block of video data.

15. The method of claim 9, wherein the first block of video data is not a transform skip block.

16. The method of claim 9, further comprising:
   determining a context for encoding the first syntax element based on an intra prediction mode used to encode the first block of video data; and
   encoding the first syntax element using the determined context.

17. An apparatus configured to decode video data, the apparatus comprising:
   a memory configured to store the video data; and
   one or more processors in communication with the memory, the one or more processors configured to:
      receive a first block of the video data, the first block being associated with a first number of non-zero transform coefficients greater than or equal to a threshold;

receive a first syntax element indicating whether a position dependent intra prediction combination (PDPC) coding mode is to be used for the first block of video data;
explicitly decode a value of the received first syntax element;
apply the PDPC coding mode to the first block of the video data in accordance with the value of the first syntax element;
receive a second block of video data, the second block being associated with a second number of non-zero transform coefficients less than the threshold;
infer a value of a second syntax element indicating whether the PDPC coding mode is to be used for the second block of video data; and
apply the PDPC coding mode in accordance with the inferred value of the second syntax element.

18. The apparatus of claim 17, wherein to receive the first syntax element, the one or more processors are further configured to receive the first syntax element based on an intra prediction mode used to encode the first block of the video data.

19. The apparatus of claim 17, wherein to receive the first syntax element, the one or more processors are further configured to receive the first syntax element in the case that the first block of the video data is larger than or equal to a predetermined size.

20. The apparatus of claim 17, wherein the threshold is one of 1, 2, or 3 non-zero coefficients.

21. The apparatus of claim 17, wherein the first number of non-zero transform coefficients includes the first number of non-zero transform coefficients for both luma and chroma components of the first block of video data.

22. The apparatus of claim 17, wherein the first block of video data includes a luma block of video data, and wherein the first number of non-zero transform coefficients include the first number of non-zero transform coefficients for the luma block of video data.

23. The apparatus of claim 17, wherein the first block of the video data is not a transform skip block.

24. The apparatus of claim 17, wherein the one or more processors are further configured to:
determine a context for decoding the first syntax element based on an intra prediction mode used to encode the first block of the video data; and
decode the first syntax element using the determined context.

25. An apparatus configured to encode video data, the apparatus comprising:
a memory configured to store the video data; and
one or more processors in communication with the memory, the one or more processors configured to:
determine whether to use a position dependent intra prediction combination (PDPC) coding mode for encoding a first block of video data;
explicitly encode a first syntax element indicating whether the PDPC coding mode is to be used for the first block of video data based on the first block of video data being associated with a first number of non-zero transform coefficients greater than or equal to a threshold;
signal the first syntax element in an encoded video bitstream;
determine whether to use the PDPC coding mode for encoding a second block of video data; and
not encode a second syntax element indicating whether the PDPC coding mode is to be used for the second block of video data based on the second block of video data being associated with a second number of non-zero transform coefficients less than the threshold.

26. The apparatus of claim 25, wherein to explicitly encode the first syntax element, the one or more processors are further configured to explicitly encode the first syntax element based on an intra prediction mode used to encode the first block of the video data.

27. The apparatus of claim 25, wherein to explicitly encode the first syntax element, the one or more processors are further configured to explicitly encode the first syntax element in the case that the first block of the video data is larger than or equal to a predetermined size.

28. The apparatus of claim 25, wherein the threshold is one of 1, 2, or 3 non-zero coefficients.

29. The apparatus of claim 25, wherein the first number of non-zero transform coefficients includes the first number of non-zero transform coefficients for both luma and chroma components of the first block of video data.

30. The apparatus of claim 25, wherein the first block of video data includes a luma block of video data, and wherein the first number of non-zero transform coefficients include the first number of non-zero transform coefficients for the luma block of video data.

31. The apparatus of claim 25, wherein the first block of the video data is not a transform skip block.

32. The apparatus of claim 25, wherein the one or more processors are further configured to:
determine a context for encoding the first syntax element based on an intra prediction mode used to encode the first block of the video data; and
encode the first syntax element using the determined context.

33. An apparatus configured to decode video data, the apparatus comprising:
means for receiving a first block of video data, the first block being associated with a first number of non-zero transform coefficients greater than or equal to a threshold;
means for receiving a first syntax element indicating whether a position dependent intra prediction combination (PDPC) coding mode is to be used for the first block of video data;
means for explicitly decoding a value of the received first syntax element;
means for applying the PDPC coding mode to the first block of video data in accordance with the value of the first syntax element;
means for receiving a second block of video data, the second block being associated with a second number of non-zero transform coefficients less than the threshold;
means for inferring a value of a second syntax element indicating whether the PDPC coding mode is to be used for the second block of video data; and
means for applying the PDPC coding mode in accordance with the inferred value of the second syntax element.

34. An apparatus configured to encode video data, the apparatus comprising:
means for determining whether to use a position dependent intra prediction combination (PDPC) coding mode for encoding a first block of video data;
means for explicitly encoding a first syntax element indicating whether the PDPC coding mode is to be used for the first block of video data based on the first block of video data being associated with a first number of non-zero transform coefficients greater than or equal to a threshold;

means for signaling the first syntax element in an encoded video bitstream;

means for determining whether to use the PDPC coding mode for encoding a second block of video data; and means for not encoding a second syntax element indicating whether the PDPC coding mode is to be used for the second block of video data based on the second block of video data being associated with a second number of non-zero transform coefficients less than the threshold.

35. A non-transitory computer-readable storage medium storing instructions that, when executed, cause one or more processors of a device configured to decode video data to:

receive a first block of video data, the first block being associated with a first number of non-zero transform coefficients greater than or equal to a threshold;

receive a first syntax element indicating whether a position dependent intra prediction combination (PDPC) coding mode is to be used for the first block of video data;

explicitly decode a value of the received first syntax element;

apply the PDPC coding mode to the first block of the video data in accordance with the value of the first syntax element;

receive a second block of video data, the second block being associated with a second number of non-zero transform coefficients less than the threshold;

infer a value of a second syntax element indicating whether the PDPC coding mode is to be used for the second block of video data; and apply the PDPC coding mode in accordance with the inferred value of the second syntax element.

36. A non-transitory computer-readable storage medium storing instructions that, when executed, cause one or more processors of a device configured to encode video data to:

determine whether to use a position dependent intra prediction combination (PDPC) coding mode for encoding a first block of video data;

explicitly encode a first syntax element indicating whether the PDPC coding mode is to be used for the first block of video data based on the first block of video data being associated with a first number of non-zero transform coefficients greater than or equal to a threshold;

signal the first syntax element in an encoded video bitstream;

determine whether to use the PDPC coding mode for encoding a second block of video data; and not encode a second syntax element indicating whether the PDPC coding mode is to be used for the second block of video data based on the second block of video data being associated with a second number of non-zero transform coefficients less than the threshold.

* * * * *